US010744840B2

(12) United States Patent
Tanaka et al.

(10) Patent No.: US 10,744,840 B2
(45) Date of Patent: Aug. 18, 2020

(54) VEHICLE HEIGHT CONTROL SYSTEM

(71) Applicants: Toyota Jidosha Kabushiki Kaisha, Toyota-shi, Aichi-ken (JP); Aisin Seiki Kabushiki Kaisha, Kariya-shi, Aichi-ken (JP)

(72) Inventors: Shogo Tanaka, Toyota (JP); Hideki Ohashi, Chiryu (JP); Jun Tokumitsu, Toyota (JP); Ryo Kanda, Nissin (JP); Ken Ogue, Okazaki (JP); Hirokazu Shiozaki, Anjo (JP); Tomoyuki Nakamura, Kariya (JP)

(73) Assignees: Toyota Jidosha Kabushiki Kaisha, Toyota-shi, Aichi-ken (JP); Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 66 days.

(21) Appl. No.: 16/103,437

(22) Filed: Aug. 14, 2018

(65) Prior Publication Data
US 2019/0061458 A1   Feb. 28, 2019

(30) Foreign Application Priority Data
Aug. 24, 2017 (JP) .................. 2017-161384

(51) Int. Cl.
*B60G 17/052* (2006.01)
*B60G 17/04* (2006.01)
(Continued)

(52) U.S. Cl.
CPC ....... *B60G 17/0525* (2013.01); *B60G 17/017* (2013.01); *B60G 17/0408* (2013.01);
(Continued)

(58) Field of Classification Search
CPC ............. B60G 17/0525; B60G 17/017; B60G 17/0408; B60G 17/0565; B60G 2202/413;
(Continued)

(56) References Cited

U.S. PATENT DOCUMENTS

| 8,989,963 B1 * | 3/2015 | Yellambalase ....... B60G 17/019 280/5.514 |
| 2003/0111807 A1 * | 6/2003 | Lee .................... B60G 17/0525 280/5.514 |

(Continued)

FOREIGN PATENT DOCUMENTS

| JP | H03070615 A | 3/1991 |
| JP | H10157432 A | 6/1998 |

(Continued)

OTHER PUBLICATIONS

Machine Translation of JPH10157432 (Year: 1998).*
U.S. Appl. No. 15/465,115, filed Mar. 21, 2017.

*Primary Examiner* — Paul N Dickson
*Assistant Examiner* — Kurtis Nielson
(74) *Attorney, Agent, or Firm* — Dinsmore & Shohl LLP

(57) ABSTRACT

A vehicle height control system includes a fluid feeder and a vehicle height control unit. The vehicle height control unit includes a communication control unit. In a first communication state, a high-pressure source and a common passage are made to communicate with each other via the first passage and the second passage. In a second communication state, the first passage is shut off and the high-pressure source and the common passage are made to communicate with each other via the second passage. The communication control unit selects one from among the plurality of communication states based on at least one of a content of a start condition, a target vehicle height of a height increasing control and a number of wheels to be controlled in the height (Continued)

increasing control, when the start condition of the height increasing control is satisfied.

10 Claims, 8 Drawing Sheets

(51) Int. Cl.
  *B60G 17/017* (2006.01)
  *B60G 17/056* (2006.01)
(52) U.S. Cl.
  CPC .... *B60G 17/0565* (2013.01); *B60G 2202/413* (2013.01); *B60G 2202/415* (2013.01); *B60G 2400/252* (2013.01); *B60G 2600/26* (2013.01)
(58) Field of Classification Search
  CPC ........ B60G 2202/415; B60G 2400/252; B60G 2600/26; B60G 2400/51; B60G 2500/30; B60G 17/048; B60G 17/015
  See application file for complete search history.

(56) References Cited

U.S. PATENT DOCUMENTS

| | | | |
|---|---|---|---|
| 2006/0142916 A1* | 6/2006 | Onuma | B60G 17/015 701/38 |
| 2009/0216403 A1* | 8/2009 | Holbrook | B60G 17/0521 701/37 |
| 2015/0151600 A1 | 6/2015 | Suzuki et al. | |
| 2015/0273972 A1* | 10/2015 | Plath | B60G 17/019 701/37 |
| 2015/0328949 A1* | 11/2015 | Frizza | B60G 17/0525 701/37 |
| 2016/0272035 A1 | 9/2016 | Oishi et al. | |
| 2017/0158018 A1 | 6/2017 | Ohashi et al. | |
| 2019/0210421 A1* | 7/2019 | Ricketts | B60G 17/0164 |

FOREIGN PATENT DOCUMENTS

| | | |
|---|---|---|
| JP | 2015105008 A | 6/2015 |
| JP | 2016-175573 A | 10/2016 |
| JP | 2017-100642 A | 6/2017 |

* cited by examiner

PATTERN A

PATTERN B

PATTERN C

VEHICLE HEIGHT CONTROL SYSTEM

CROSS-REFERENCE TO RELATED APPLICATIONS

This application claims priority to Japanese Patent Application No. 2017-161384 filed on Aug. 24, 2017, which is incorporated herein by reference in its entirety.

BACKGROUND

1. Technical Field

The disclosure relates to a vehicle height control system that controls a vehicle height of each wheel.

2. Description of Related Art

In a vehicle height control system described in Japanese Unexamined Patent Application Publication No. 03-070615 (JP 03-070615 A), a vehicle height is increased by supplying air to an air cylinder when the vehicle height is lower than a target vehicle height; whereas a vehicle height is reduced by discharging air from the air cylinder when the vehicle height is higher than the target vehicle height. In a vehicle height control system described in Japanese Unexamined Patent Application Publication No. 2016-175573 (JP 2016-175573 A), an air cylinder and a tank are made to communicate with each other via a first flow passage hue or a second flow passage line in an early stage of vehicle height control, the air cylinder and the tank are made to communicate with each other via the first flow passage line and the second How passage line in a mid stage of vehicle height control, and the air cylinder and the tank are made to communicate with each other via the first flow passage line or the second flow passage line in a final stage of vehicle height control. Thus, the time required until a vehicle height reaches a target vehicle height is shortened while a shock at the time of the start of change in vehicle height and a shock at the time of the end of change in vehicle height are reduced.

It is a task of the disclosure to, when height increasing control for increasing a vehicle height is executed, make it possible to provide communication between a high-pressure source and a common passage to which a plurality of vehicle height control actuators is connected in a communication state suitable for the height increasing control.

An aspect of the disclosure provides a vehicle height control system. The vehicle height control system includes a plurality of vehicle height control actuators, a fluid feeder, and a vehicle height control unit. The plurality of vehicle height actuators is provided in correspondence with a plurality of wheels of a vehicle. The fluid feeder includes a common passage and an electromagnetic valve device. Each of the vehicle height control actuators is connected to the common passage via a corresponding one of vehicle height control valves. The electromagnetic valve device includes (a) a high-pressure source, (b) a plurality of passages including a first passage and a second passage that connect the high-pressure source to the common passage in parallel with each other, and (c) at least one electromagnetic valve provided in each of the first passage and the second passage. The fluid feeder is configured to be able to supply fluid to the common passage. The vehicle height control unit includes a communication control unit. The communication control unit is configured to provide communication between the high-pressure source and the common passage by controlling the electromagnetic valve device based on one of a plurality of communication states including a first communication state and a second communication state. The first communication state is a state where the high-pressure source and the common passage are made to communicate with each other via the first passage and the second passage. The second communication state is a state where the first passage is shut off and the high-pressure source and the common passage are made to communicate with each other via the second passage. The vehicle height control unit is configured to execute height increasing control for increasing a vehicle height of at least one wheel to be controlled out of the plurality of wheels by making at least one of the plurality of vehicle height control actuators provided in the at least one wheel to be controlled communicate with the common passage through control over the corresponding vehicle height control valve to supply fluid from the high-pressure source to the vehicle height control actuator of the at least one wheel to be controlled. The communication control unit is configured to, when a start condition of the height increasing control is satisfied, select one from among the plurality of communication states based on at least one of a content of the start condition, a target vehicle height of the height increasing control and the number of wheels to be controlled in the height increasing control.

With the above vehicle height control system, when a start condition of the height increasing control is satisfied, the common passage to which the plurality of vehicle height control actuators is connected and the high-pressure source are made to communicate with each other in a state selected based on at least one of a content of the start condition, a target vehicle height of the height increasing control and the number of wheels to be controlled in the height increasing control. The start condition is satisfied when there is a request for the height increasing control. The target vehicle height is determined based on the request for the height increasing control. For this reason, when the communication status between the common passage and the high-pressure source is set to a state that is determined based on the content of the start condition and the target vehicle height, the common passage and the high-pressure source are made to communicate with each other in a communication state suitable for the height increasing control in other words, a communication state that suits the request for the height increasing control. As compared to when the number of wheels to be controlled is small, when the number of wheels to be controlled is large, the number of the vehicle height control actuators that are made to communicate with the common passage increases, and the How rate of fluid that is supplied to each of the vehicle height control actuators reduces when the flow rate of fluid that is supplied to the common passage is the same. For this reason, for example, when the rate of change in vehicle height that is required of the height increasing control is the same between when the number of wheels to be controlled is large and the number of wheels to be controlled is small, it is required to increase the flow rate of fluid that is supplied to the common passage when the number of wheels to be controlled is large as compared to when the number of wheels to be controlled is small. In this way, it is possible to provide communication between the common passage and the high-pressure source in a communication state suitable for the height increasing control, in other words, a communication state that suits a request for the height increasing control, based on the number of wheels to be controlled.

In the vehicle height control system, the communication control unit may be configured to: (i) select one from among the plurality of communication states based on the content of the start condition, (ii) select the first communication state when the start condition is satisfied, the start condition being a start condition that it is estimated that a person gets on the vehicle in a state where the vehicle is stopped, and (iii) select one from among at least one communication state obtained by excluding the first communication state from the plurality of communication states when the start condition is satisfied, the start condition being a start condition other than the start condition that it is estimated that a person gets on the vehicle in a state where the vehicle is stopped.

In the vehicle height control system, the communication control unit may be configured to select one from among the at least one communication state obtained by excluding the first communication state from the plurality of communication states when (a) the start condition is satisfied, the start condition being a start condition that it is estimated that a person gets off the vehicle in a state where the vehicle is stopped, (b) the start condition is satisfied, the start condition being a start condition that a travel speed of the vehicle has changed from a state where the travel speed is higher than or equal to a first set speed to a state where the travel speed is lower than or equal to a second set speed lower than the first set speed in a state where the vehicle is traveling, or (c) the start condition is satisfied, the start condition being a start condition that a vehicle height of at least one wheel out of the plurality of wheels has reduced by a set value or more in a state where the vehicle is traveling.

In the vehicle height control system, the communication control unit may be configured to: (i) select one from among the plurality of communication states based on the target vehicle height, (ii) select the first communication state, when the target vehicle height is higher than or equal to a set vehicle height, and (iii) select one from among at least one communication state obtained by excluding the first communication state from the plurality of communication states, when the target vehicle height is lower than the set vehicle height. The set vehicle height is a vehicle height higher than a normal vehicle height by a set value or more, and means a vehicle height at which it is considered to be desirable to select the first communication state when the vehicle height is increased to the set vehicle height. The target amount of change in vehicle height when the target vehicle height is high is often larger than the target amount of change in vehicle height when the target vehicle height is low. For this reason, the first communication state is selected when the target vehicle height is higher than or equal to the set vehicle height. Thus, it is possible to quickly bring a real vehicle height close to the target vehicle height. When the target vehicle height is determined in advance based on the content of a start condition, the content of the start condition can be found based on the target vehicle height. A target amount of change in vehicle height may be used instead of a target vehicle height.

In the vehicle height control system, the communication control unit may be configured to: (i) select one from among the plurality of communication states based on the number of wheels to be controlled, (ii) select the first communication state, when the number of wheels to be controlled is four, and (iii) select one from among at least one communication state obtained by excluding the first communication state from the plurality of communication states, when the number of wheels to be controlled is three or less. When front and rear, right and left four wheels are the wheels to be controlled, the four vehicle height control valves are open, and the four vehicle height control actuators are made to communicate with the common passage. When three or less wheels out of the front and rear, right and left four wheels are the wheels to be controlled, the three or less vehicle height control actuators are made to communicate with the common passage. The first communication state may be selected when three or more wheels are the wheels to be controlled. One out of at least one communication state obtained by excluding the first communication state from the plurality of communication states may be selected when two or less wheels are the wheels to fee controlled.

In the vehicle height control system, the high-pressure source may include a tank, the fluid feeder may include a tank pressure sensor configured to detect a tank pressure that is a pressure of fluid stored in the tank, and the communication control unit may be configured to (i) select one from among the plurality of communication states based on the tank pressure detected by the tank pressure sensor, (ii) when the tank pressure is lower than a set tank pressure, select the first communication state, and (iii) select one from among at least one communication state obtained by excluding the first communication state from the plurality of communication states, when the tank pressure is higher than or equal to the set tank pressure. At this time, the communication control unit may be employed at the time of selecting the communication status at the beginning or may be employed at the time of selecting the communication status during control.

In the vehicle height control system, the communication control unit may be configured to: (i) select one from among the plurality of communication states during the height increasing control, (ii) select the first communication state, when an amount of change in real vehicle height that is an actual vehicle height during the height increasing control is smaller than a set target amount of change that is determined based on a target amount of change in vehicle height for the height increasing control, and (iii) select one from among at least one communication state obtained by excluding the first communication state from the plurality of communication states, when the amount of change in real vehicle height is larger than or equal to the set target amount of change.

In the vehicle height control system, the fluid feeder may include a third passage, the third passage may be provided between the high-pressure source and the common passage in parallel with the first passage and the second passage, the third passage may have a larger passage resistance than the first passage or the second passage, and the plurality of communication states may include a third communication state in addition to the first communication state and the second communication state. The third communication state may be a communication state where the first passage and the second passage are shut off and the high-pressure source and the common passage are made to communicate with each other via the third passage. The third passage may be, for example, a passage having a smaller passage sectional area than the first passage or the second passage, a long passage, a passage in which a component having a throttle function is provided midway, or the like.

In the vehicle height control system, the communication control unit may be configured to select the third communication state when the start condition is satisfied, the start condition being a start condition that a vehicle height of at least one wheel out of the plurality of wheels has reduced by a set value Or more in a state where the vehicle is traveling.

In the vehicle height control system, the fluid feeder may include a third passage, the third passage may be provided between the high-pressure source and the common passage in parallel with the first passage and the second passage, the third passage may have a larger passage resistance than the first passage or the second passage, and the plurality of communication states may include a third communication state where the first passage and the second passage are shut off and the high-pressure source and the common passage are made to communicate with each other via the third passage, in addition to the first communication state and the second communication state, and the communication control unit may be configured to (i) select the first communication state, when an amount of change in real vehicle height that is an actual vehicle height during the height increasing control is smaller than a first set amount of change that is determined based on the target amount of change in vehicle height, (ii) select the second communication state, when the amount of change in real vehicle height is larger than or equal to the first set amount of change and smaller than or equal to a second set amount of change larger than the first set amount of change, and (iii) select the third communication state, when the amount of change in real vehicle height is larger than the second set amount of change.

With the vehicle height control system according to the aspect of the disclosure, when height increasing control for increasing a vehicle height is executed, it is possible to make the common passage to which the plurality of vehicle height control actuators is connected and the high-pressure source communicable in a communication state suitable for the height increasing control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, a vehicle height control system that is one embodiment of the disclosure will be described in detail with reference to the accompanying drawings. In the vehicle height control system, air is utilized as fluid.

Figure 1:
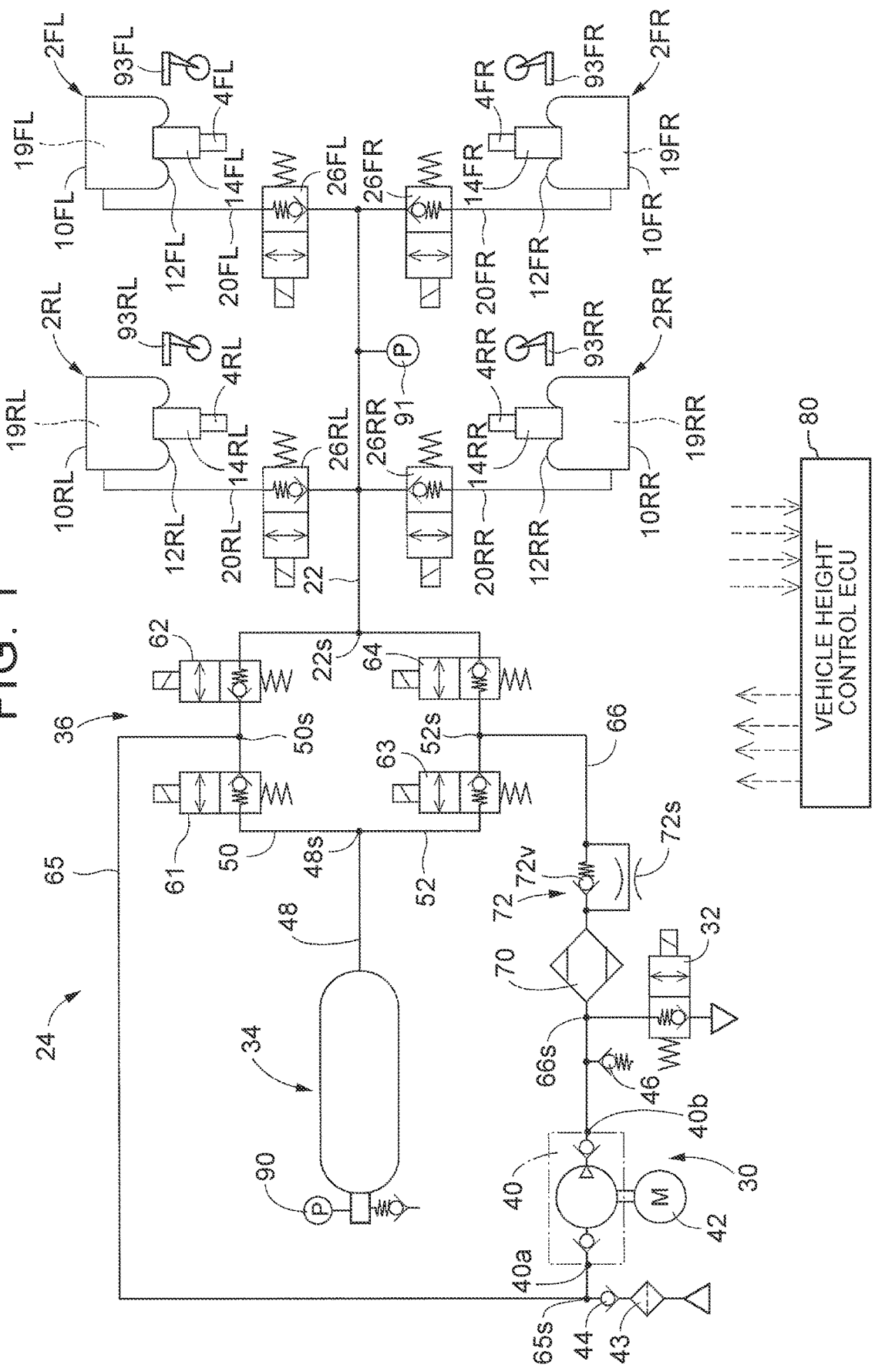
FIG. 1 is a circuit diagram that shows a vehicle height control system according to a first embodiment of the disclosure.

In the vehicle height control system according to a first embodiment, as shown in FIG. 1, a suspension spring (not shown), any one of air cylinders 2FR, 2FL, 2RR, 2RL, and any one of shock absorbers 4FR, 4FL, 4RR, 4RL are provided between a wheel-side member (which corresponds to, for example, a suspension arm that supports a wheel) and a vehicle body-side member in correspondence with a corresponding one of front and rear, right and left wheels of a vehicle. The suspension springs, the air cylinders 2FR, 2FL, 2RR, 2RL, and the shock absorbers 4FR, 4FL, 4RR, 4RL are provided in parallel with one another. The air cylinders 2FR, 2FL, 2RR, 2RL serve as vehicle height control actuators. Each of the shock absorbers 4FR, 4FL, 4RR, 4RL includes an absorber body and an absorber piston. The absorber body is provided on the wheel-side member. The absorber piston is provided on the vehicle body-side member. Hereinafter, in this specification, the air cylinders 2, the shock absorbers 4, and other components, are differentiated by adding suffixes FR, FL, RR, RL indicating the positions of the wheels when needed to differentiate by the positions of the wheels; whereas the suffixes FR, FL, RR, RL that indicate the positions of the wheels are not added, for example, when not needed to differentiate by the positions of the wheels or when collectively referred.

Each air cylinder 2 includes a cylinder body 10, a diaphragm 12 and an air piston 14. The cylinder body 10 is provided on the vehicle body-side member. The diaphragm 12 is fixed to the cylinder body 10. The air piston 14 is provided ort the diaphragm 12 and the absorber body of the shock absorber 4 so as to be relatively immovable in an up-down direction. The inside of each air cylinder 2 is defined as an air chamber 19 that serves as a fluid chamber. By supplying or discharging air to or from the air chamber 19, the air piston 14 is relatively moved in the up-down direction with respect to the cylinder body 10. Thus, the absorber body and the absorber piston in the shock absorber 4 are relatively moved in the up-down direction. As a result, a vehicle height is changed. The vehicle height is a distance between the wheel-side member and the vehicle body-side member.

An air supply and discharge device 24 is connected to each of the air chambers 19 of the air cylinders 2 via a common passage 22 and a corresponding one of individual passages 20. The air supply and discharge device 24 serves as a fin id feeder. A vehicle height control valve 26 is provided in each of the individual passages 20. The vehicle height control valve 26 is a normally-closed electromagnetic valve, and is opened or closed by turning on or off its solenoid. The vehicle height control valve 26 permits bidirectional flow of air in an open state, and blocks flow of air from the air chamber 19 to the common passage 22 in a closed state. The vehicle height control valve 26 permits flow of air from the common passage 22 to the air chamber 19 as the pressure in the common passage 22 becomes higher than the pressure in the air chamber 19 by a set pressure or more.

The air supply and discharge device 24 includes a compressor device 30, a discharge valve 32, a tank 34, a switching device 36, a suction valve 44, a relief valve 46, and the like. The discharge valve 32 is a normally-closed electromagnetic valve. The compressor device 30 includes a compressor 40 and an electric motor 42 that drives the compressor 40. The compressor 40 is actuated as it is driven by the electric motor 42. As the discharge pressure of the compressor 40 increases, air is released into the atmosphere via the relief valve 46. The tank 34 is used to accommodate air in a pressurized state. As the amount of air accommodated in the tank 34 increases, a tank pressure that is the pressure of the accommodated air increases.

The switching device 36 is provided between the common passage 22, the tank 34, and the compressor device 30. The switching device 36 switches, for example, a direction in which air flows between these components. As shown in FIG. 1, a tank passage 48 to which the tank 34 is connected is connected to a first passage 50 and a second passage 52 at a connection point 48s. The first passage 50 and the second passage 52 are provided in parallel with each other. The common passage 22 is connected to the first passage 50 and the second passage 52 at a connection point 22s. Two circuit valves 61, 62 are provided in the first passage 50 in series with each other. Two circuit valves 63, 64 are provided in the second passage 52 in series with each other. A suction-side passage 65 connects a point 50s between the two circuit valves 61, 62 of the first passage 50 to a suction-side portion 40a of the compressor 40. A discharge-side passage 66 connects a discharge-side portion 40b of the compressor 40 to a point 52s between the two circuit valves 63, 64 of the second passage 52.

Each of the circuit valves 61, 62, 63, 64 is a normally-closed electromagnetic valve, and is switched between an open state and a closed state as its solenoid is turned on or off. When current is supplied to the solenoid to turn on the solenoid, the corresponding circuit valve is set to the open state. In the open state, the circuit valve permits bidirectional flow of air. When no current is supplied to the solenoid to leave the solenoid in an off state, the circuit valve is set to the closed state. In the closed state (a state where the solenoid is in the off state), the circuit valve blocks flow of air from one side to the other side; however, as the pressure at the other side becomes higher than the pressure at the one side by a set pressure or more, the circuit valve permits flow of air from the other side to the one side. The circuit valves 61, 63 block outflow of air from the tank 34 in the closed state. The circuit valve 62 blocks outflow of air from the common passage 22 in the closed state. The circuit valve 64 blocks supply of air to the common passage 22 in the closed state.

The suction valve 44 is provided between a connection point 65s of the suction-side passage 65 and the atmosphere. The suction valve 44 is a check valve that is closed when the pressure of air at the connection point 65s is higher than or equal to atmospheric pressure and that is open when the pressure of air at the connection point 65s is lower than atmospheric pressure. As the pressure of sir at the connection point 65s becomes lower than atmospheric pressure as a result of actuation of the compressor 40, air is introduced from the atmosphere via a filter 43 and the suction valve 44. The discharge valve 32 is connected to the connection point 66s of the discharge-side passage 66. The discharge valve 32 is a normally-closed electromagnetic valve. The discharge valve 32 permits a discharge of air from the discharge-side passage 66 into the atmosphere in the open state. The discharge valve 32 blocks a discharge of air from the discharge-side passage 66 into the atmosphere in the closed state. As the pressure of air in the discharge-side passage 66 becomes lower than atmospheric pressure by a set pressure or more, supply of air from the atmosphere to the discharge-side passage 66 is permitted. A dryer 70 and a flow check mechanism 72 are provided in series with each other at a portion of the discharge-side passage 66. The portion of the discharge-side passage 66 is on the second passage side of the connection point 66s. The How check mechanism 72 includes a differential pressure regulating valve 72v and a throttle 72s. The differential pressure regulating valve 72v and the throttle 72s are provided in parallel with each other. The differential pressure regulating valve 72v blocks flow of air from the second passage side to the compressor side. The differential pressure regulating valve 72v permits How of air from the compressor 40 to the second passage 52 as the compressor-side pressure becomes higher than the second passage-side pressure by a set pressure or more.

Figure 2:
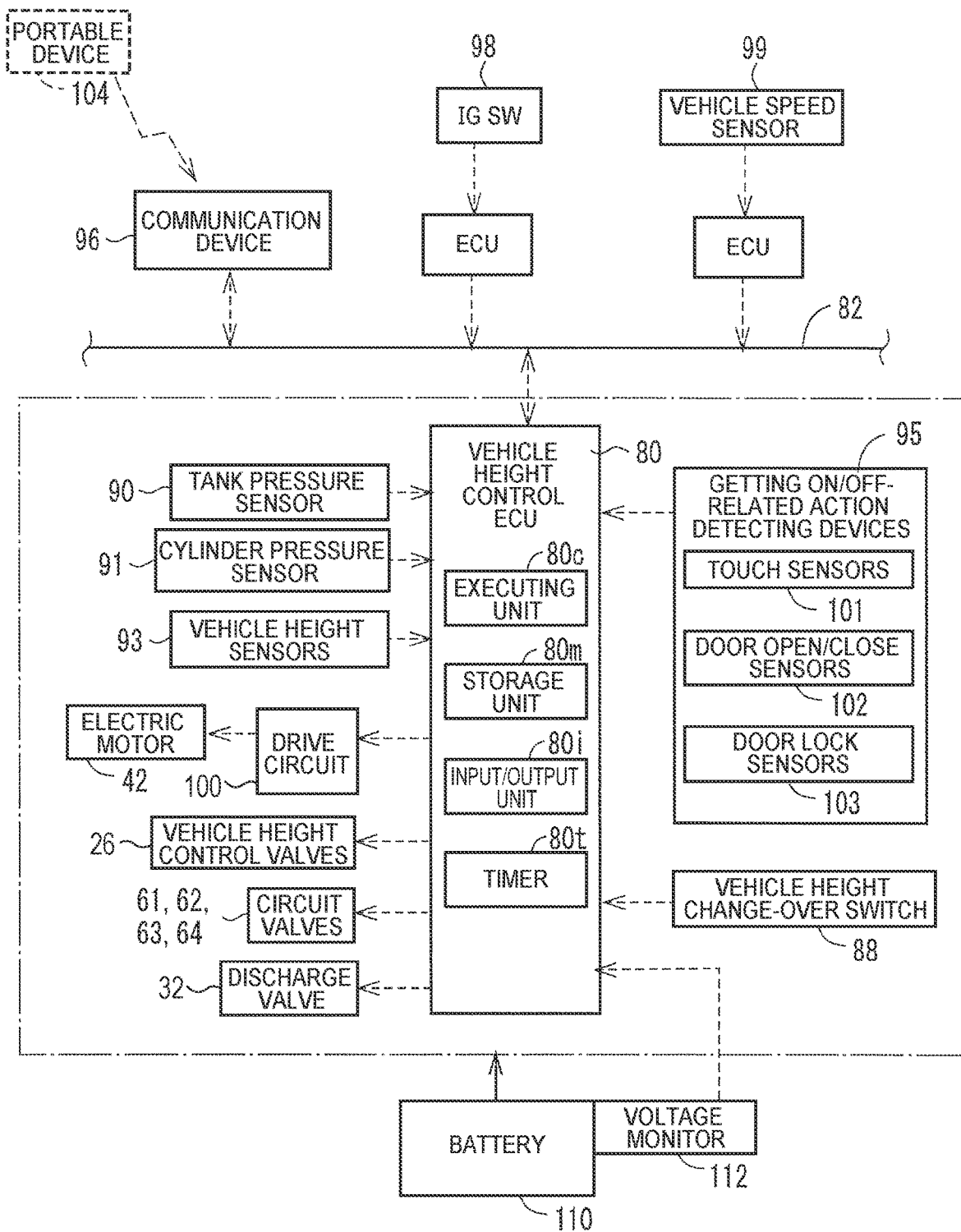
FIG. 2 is a conceptual view that shows devices around a vehicle height control ECU of the vehicle height control system.

In the first embodiment, the vehicle height control system is controlled by a vehicle height control ECU 80 that mainly includes a computer. The vehicle height control ECU 80 is communicable with another ECU, or the like, via a controller area network (CAN) 82. As shown in FIG. 2, the vehicle height control ECU 80 includes an executing unit 80c, a storage unit 80m, an input/output unit 80i, a timer 80t, and the like. A vehicle height change-over switch 88, a rank pressure sensor 90, a cylinder pressure sensor 91, vehicle height sensors 93, getting on/off-related action detecting devices 95, and the like, are connected to the input/output unit 80i. A communication device 96, an ignition switch 98, a vehicle speed sensor 99, and the like, are connected to the input/output unit 80i via the CAN 82. The electric motor 42 is connected to the input/output unit 801 via a drive circuit 100. The discharge valve 32, the vehicle height control valves 26 and the circuit valves 61, 62, 63, 64 are connected to the input/output unit 80i.

The vehicle height change-over switch 88 is operated by a driver. The vehicle height change-over switch 88 is operated when the driver provides instructions to change the vehicle height to any one of Low (L), Normal (N) and High (H). The tank pressure sensor 90 is used to detect a tank pressure. The cylinder pressure sensor 91 is provided in the common passage 22. When the vehicle height control valve 26 is open, the cylinder pressure sensor 91 detects a cylinder pressure that is the pressure in the air chamber 19 of a cylinder 2 (corresponding to the wheel) corresponding to the open-state vehicle height control valve 26. The cylinder pressure sensor 91 also detects a passage pressure in a state where all the vehicle height control valves 26 are closed. The passage pressure is the pressure of air in the common passage 22. Each vehicle height sensor 93 is provided in correspondence with a corresponding one of the front and rear, right and left wheels. Each vehicle height sensor 93 detects a vehicle height that is a distance from the wheel side member to the vehicle body-side member. Each getting on/off-related action detecting device 95 is used to detect whether there is an action related to getting on or off the vehicle. Each getting on/off-related action detecting device 95 is provided in correspondence with a corresponding one of a plurality of doors of the vehicle. Each getting on/off related action detecting device 95 includes a touch sensor 101, a door open/close sensor (courtesy lamp sensor) 102, a door lock sensor 103, and the like. The touch sensor 101 detects whether a person has touched the door knob. The door open/close sensor (courtesy lamp sensor) 102 detects the open or closed state of the door. The door lock sensor 103 detects a locked or unlocked state of the corresponding door. For example, a driver's intention to get on or get off the vehicle is estimated based on whether there is an action to open or close the door, whether there is art action to lock or unlock the door, or the like. The communication device 96 is used to carry out communication with a portable device 104 held by the driver, or the like, in a predetermined communicable area. The ignition switch 98 is a main switch of the vehicle. The vehicle speed sensor 99 is used to detect the travel speed of the vehicle. The vehicle height control system, and the like, in the first embodiment are operable on electric power from a battery 110. The voltage of the battery 110 is detected by a voltage monitor 112. The voltage monitor 112 is connected to the vehicle height control ECU 80.

In the thus configured vehicle height control system, when a predetermined start condition is satisfied, a pattern is selected based on the content of the start condition, or the like, and the common passage 22 and the tank 34 are made to communicate with each other in the selected pattern. The vehicle height control valve 26 of each wheel to be controlled is opened, and air is supplied from the tank 34 to the air cylinder 2 of each wheel to be controlled. As a result, the vehicle height of each wheel to be controlled is increased.

1) The start condition is satisfied when it is estimated that a person gets on the vehicle, and height increasing control for increasing the vehicle height to a height suitable for getting on the vehicle is executed. For example, in the case where the ignition switch 98 is in an off state and the vehicle is in a stopped state, (i) when the doors are unlocked in response to unlock instructions received from the portable device 104 by the communication device 96 and then a change of the status of any one of the doors from the closed state to the open state has been detected by the corresponding getting on/off-related action detecting device 95 or (ii) when a touch of the door knob has been detected by the corresponding getting on/off-related action detecting device 95 without unlock instructions received from the portable device 104 by the communication device 96 (when a touch of the door knob has been detected, the status of the door is changed from the locked state to the unlocked state), it is estimated that a human gets on the vehicle.

It is ergonomically known that a height Ht1 suitable for getting on the vehicle, which is a target vehicle height, is higher than a set vehicle height Hs (a value higher than a normal vehicle height by a set value) (Ht1>Hs). Since a person tends to feel that it is easy to get on the vehicle when the person feels the height of a seat easy to sit, the vehicle height at which the person easily gets on the vehicle is set to a height higher than the set vehicle height Hs. The wheels to be controlled are often the front and rear, right and left four wheels. A person gets on the vehicle, the ignition switch 98 is changed from the off state to an on state, the vehicle starts moving, and then the vehicle height is reduced. In this way, the vehicle height is controlled to a height suitable for traveling (as will be described later, when the travel speed is lower than a first set speed, the vehicle height is set to a substantially normal vehicle height that is a height suitable for traveling).

2) The start condition is satisfied when it is estimated that a person gets off the vehicle, and height increasing control for increasing the vehicle height to a height suitable for getting off the vehicle is executed. For example, when the vehicle has stopped, a change of the doors from the locked state to the unlocked state and then a change of the status of any one of the doors from the closed state to the open state has been detected by the corresponding getting on/off-related action detecting device 95, it is estimated that a person gets off the vehicle. It is ergonomically known that a height Ht2 suitable for getting off the vehicle, which is a target vehicle height, is lower than the height Ht1 suitable for getting on the vehicle (lower than the set vehicle height Hs and higher than the normal vehicle height H0) (H0<Ht2<Hs<Ht1). When a person gets off the vehicle the person puts the feet on the ground, so the vehicle height lower than the set vehicle height Hs is regarded as a vehicle height that the person easily gets off the vehicle. The wheels to be controlled are often the front and rear, right and left four wheels.

3) In a state where the vehicle is traveling, the start condition is satisfied when the travel speed of the vehicle has changed from a state where the travel speed is higher than or equal to a first set speed to a state where the travel speed is lower than or equal to a second set speed that is lower than the first set speed. Height increasing control for increasing the vehicle height to substantially a normal vehicle height (a vehicle height suitable for traveling when the travel speed is lower than the first set speed) is executed. When the travel speed of the vehicle becomes higher than or equal to the first set speed, the vehicle height is reduced (set to a height lower than the normal vehicle height) in order to improve travelling stability. After that, when the travel speed becomes lower than or equal to the second set speed, the vehicle height is returned to the original height, in other words, a substantially normal vehicle height (the target vehicle height is set to a substantially normal vehicle height). The wheels to fee controlled in this case are the front and rear, right and left four wheels.

4) In a state where the vehicle is traveling, the start condition is satisfied when the vehicle height has reduced by a set value or more because of a change in load, or the like, height increasing control for increasing the vehicle height to a height before reduction, that is, a substantially normal vehicle height (the target vehicle height is set to a substantially normal vehicle height) is executed. This vehicle height control is called auto-leveling. The start condition in this case is also a condition to activate auto-leveling. The wheel(s) to be controlled in this case is/are the wheel(s) of which the vehicle height has reduced by a set value or more and can be one wheel or two wheels.

5) When the vehicle height change-over switch 88 has been operated, the start condition can be satisfied, and height increasing control for increasing the vehicle height to a height designated through the operation of the vehicle height change-over switch 88 can be executed. In the first embodiment, it is possible to provide instructions to change the vehicle height to any one of "Low", "Normal" and "High" through operation of the vehicle height change-over switch 88. The "High" vehicle height is set to a value lower than the set vehicle height Hs. The wheels to be controlled in this case are the front and rear, right and left four wheels.

In the first embodiment, when the start condition is satisfied, one of the patterns A, B, C is selected based on the start condition, and the circuit valves 61, 62, 63, 64 are controlled in accordance with the selected pattern.

Figure 3:
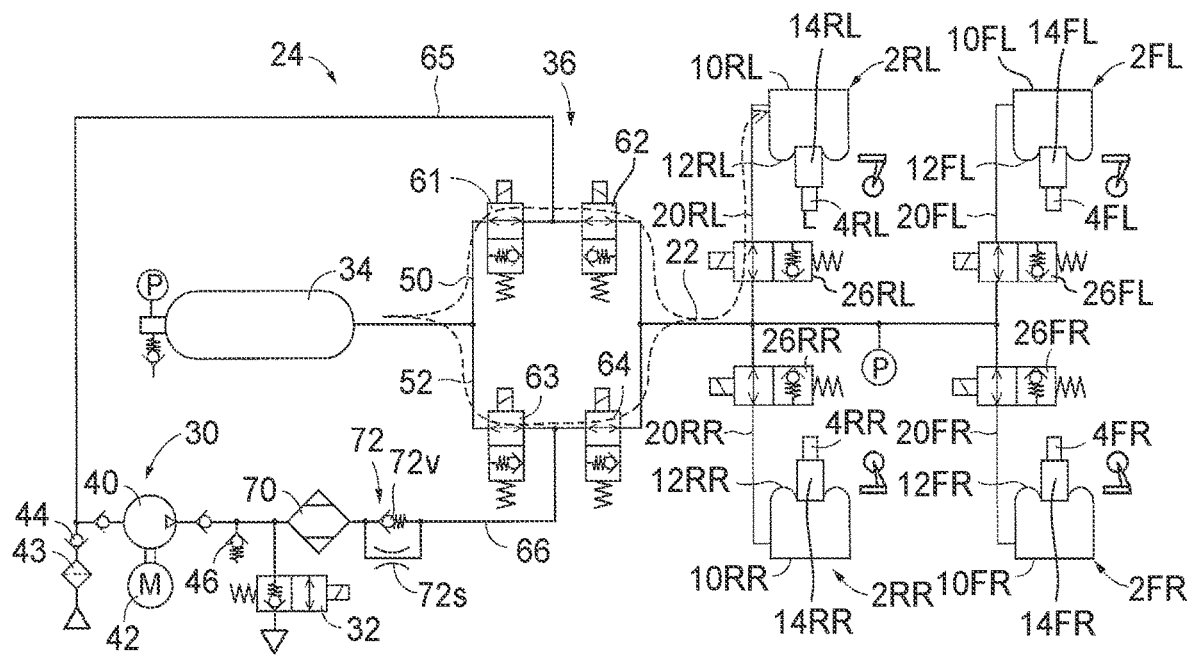
FIG. 3 is a diagram that shows a state where height increasing control (pattern A) is executed in the vehicle height control system.
Figure 4:
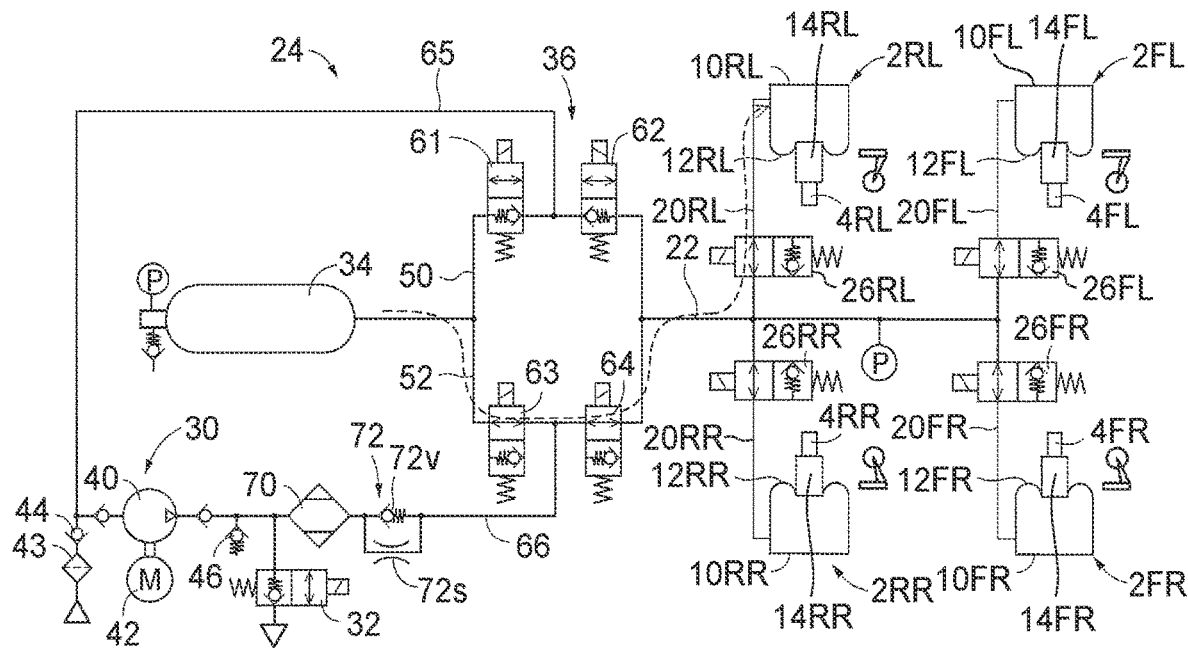
FIG. 4 is a diagram that shows a state where other height increasing control (pattern B) other than the height increasing control (pattern A) is executed.
Figure 5:
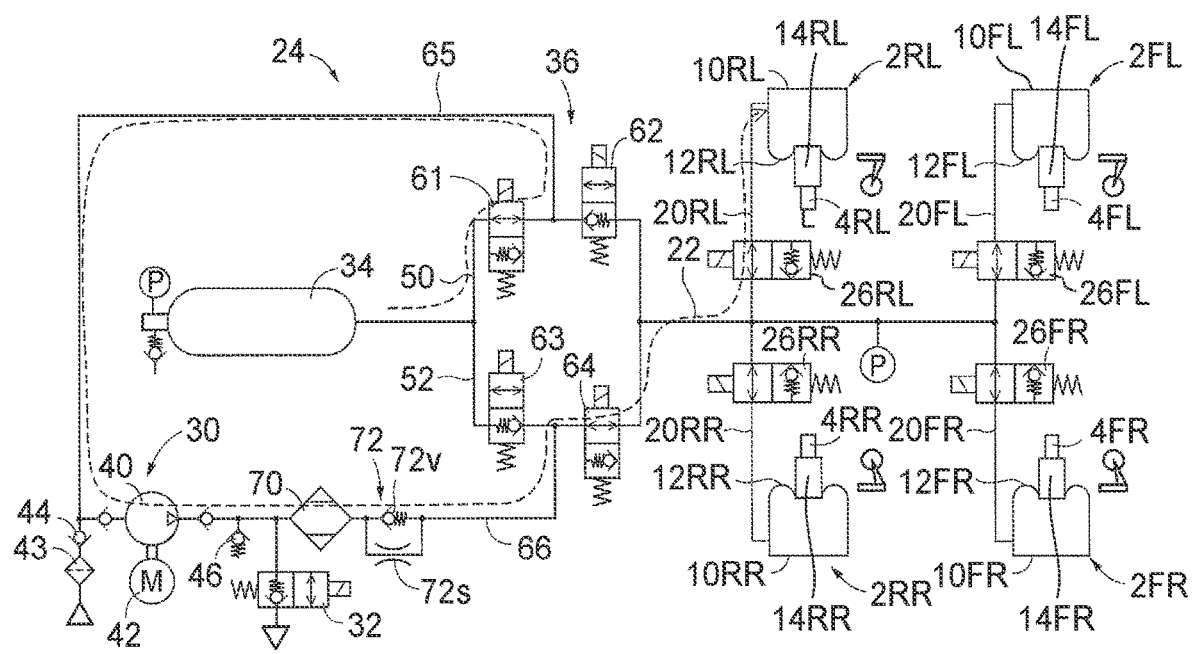
FIG. 5 is a diagram that shows a state where further other height increasing control (pattern C) other than the height increasing control (pattern A) or the height increasing control (pattern B) is executed.

In the pattern A, as shown in FIG. 3, the circuit valves 61, 62, 63, 64 are opened, and the tank 34 and the common passage 22 are made to communicate with each other via the first passage 50 and the second passage 52. In the pattern B, as shown in FIG. 4, the circuit valves 61, 62 are closed and the circuit valves 63, 64 are opened, and the tank 34 and the common passage 22 are made to communicate with each other via the second passage 52. In the pattern C, as shown in FIG. 5, in a state where the compressor 40 is stopped, the circuit valves 62, 63 are closed, and the circuit valves 61, 64 are opened. The tank 34 and the common passage 22 are made to communicate with each other via part of the first passage 50, the suction-side passage 65, the compressor 40, the discharge-side passage 66 and part of the second passage 52. In the pattern C, air in the tank 34 is supplied to the common passage 22 by opening the suction valve and discharge valve of the compressor 40.

Figure 6:
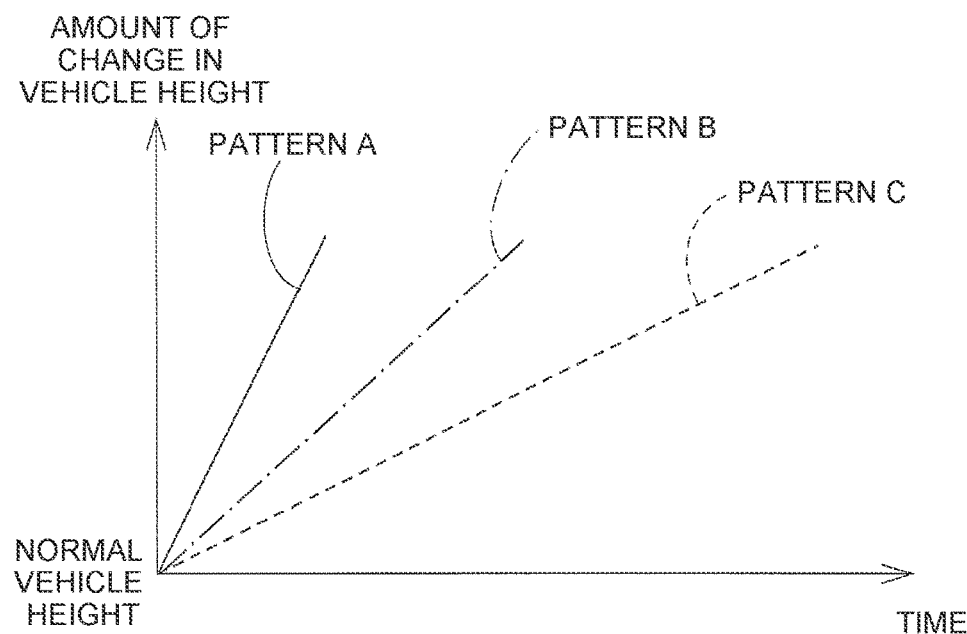
FIG. 6 is a graph that shows the relation between time and a change in vehicle height when height increasing control has been executed in the case where any one of the patterns A, B, C is set.

FIG. 6 shows the rate of change in vehicle height in each of the patterns A, B, C when the differential pressure between the tank 34 and the common passage 22 is the same and the wheels to be con tic tied are the same. As indicated by a continuous line in FIG. 6, when the pattern A is set, the rate of change in vehicle height is the highest, and the flow rate of air that is supplied to the common passage 22 is the highest. As indicated by a broken line, when the pattern C is set, the rate of change in vehicle height is the lowest, and the flow rate of air that is supplied to the common passage 22 is the lowest. As indicated by alternate long and short dash lines, when the pattern B is set, the rate of change in vehicle height and the flow rate of air that is supplied to the common passage 22 both are middle between those in the pattern A and those in the pattern C.

In the first embodiment, when the start condition that it is estimated that a person gets on the vehicle is satisfied, the pattern A is selected. In a period from when it is estimated that a person gets on the vehicle to when the person gets on the vehicle, the vehicle height needs to be quickly increased to the target vehicle height Ht1. For example, a real vehicle height that is an actual vehicle height in the case where the start condition is satisfied is often substantially the same as the vehicle height Ht2 suitable for getting off the vehicle; however, a difference (Ht1−Ht2) between the real vehicle height and the target vehicle height is larger than a difference (Ht2−H0) between a real vehicle height in the case where it is estimated that a person gets off the vehicle (the real vehicle height is often substantially the normal vehicle height as will be described later) and the target vehicle height Ht2 ((Ht1−Ht2)>(Ht2−H0)). In this way, when it is estimated that a person gets on the vehicle, the vehicle height needs to be increased by (Ht1−Ht2) before the person gets on the vehicle. The vehicle height needs to be quickly increased. For this reason, the pattern A is selected.

When the start condition that it is estimated that a person gets off the vehicle is satisfied, the pattern B is selected. As described above, a real vehicle height in the case where the start condition is satisfied is often substantially the normal vehicle height; however, a difference (Ht2−H0) between the real vehicle height (normal vehicle height H0) and the target vehicle height Ht2 is smaller than the difference (Ht1−Ht2) in the case where it is estimated that a person gets on the vehicle. For this reason, even when the pattern B is selected, it is possible to increase the real vehicle height to a target vehicle height that is a vehicle height suitable for getting off the vehicle in a period from when it is estimated that a person gets off the vehicle to when the person gets off the vehicle. In other words, it is also possible that the pattern A is selected when it is estimated that a person gets off the vehicle; however, the pattern B is selected because of the lower necessity to quickly increase the vehicle height.

When the start condition that the travel speed of the vehicle has changed from a state higher than or equal to the first set speed to a state lower than or equal to the second set speed is satisfied, the pattern B is selected even when auto-leveling is activated. Quickly increasing the vehicle height in a state where the vehicle is traveling is not desirable from the viewpoint of traveling stability. An occupant can experience a feeling of strangeness. The target vehicle height is lower than the set vehicle height Hs. From the above, when the height increasing control is executed in a state where the vehicle is traveling, it is desirable to select the pattern B. When auto-leveling is activated, the pattern C may be selected.

6) When the vehicle height change-over switch 88 has been operated as well, the pattern B is selected. This is because of the lower necessity to quickly increase the vehicle height in this case.

In the first embodiment, when the pattern A is selected at the start of the vehicle height control, the pattern is changed even during vehicle height control. In the first embodiment, as a real vehicle height increases and approaches the target vehicle height during the height increasing control, the communication status between the tank 34 and the common passage 22 is changed in order of the patterns A, B, C.

Figure 7:
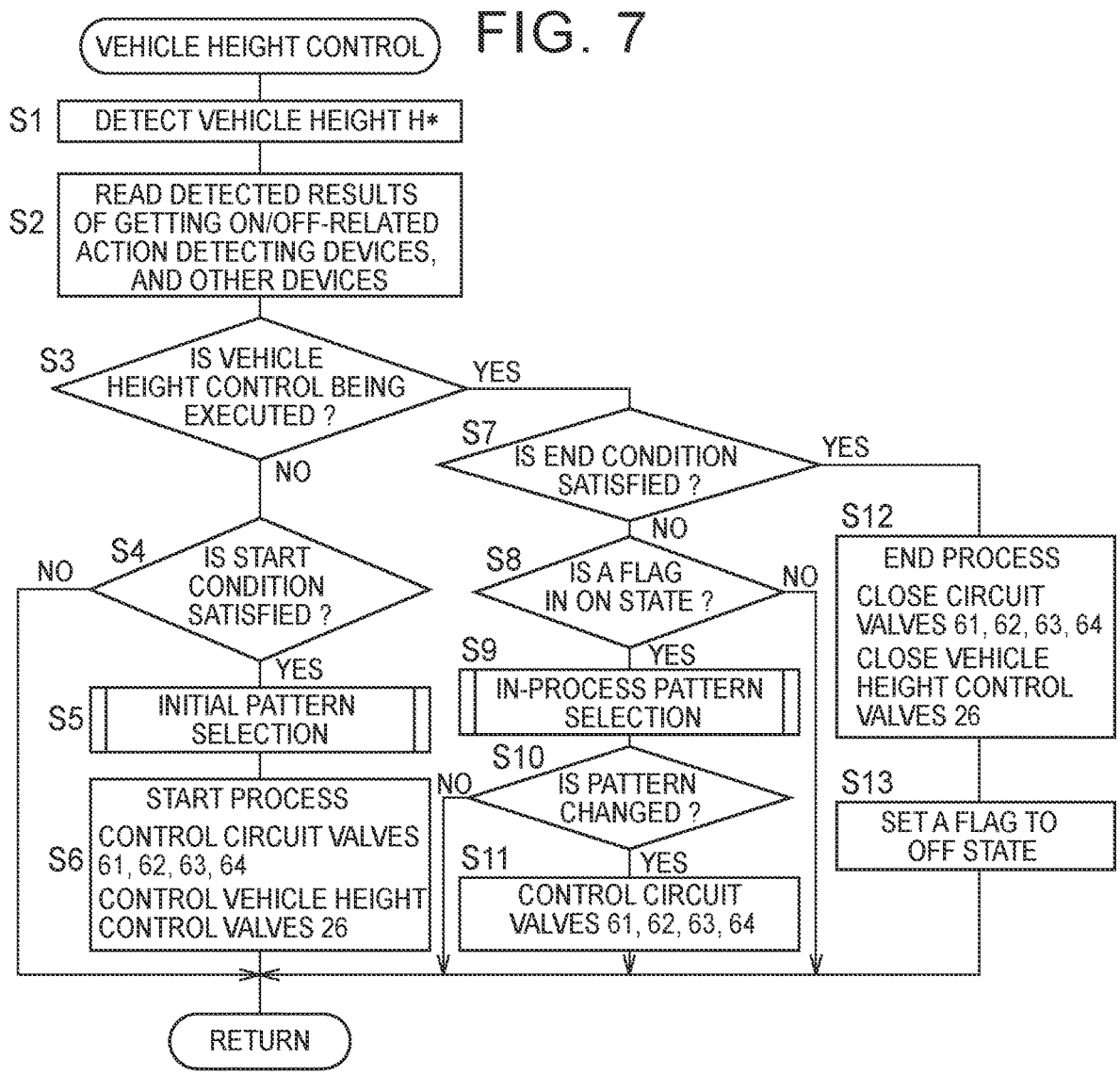
FIG. 7 is a flowchart that shows a vehicle height control program stored in a storage unit of the vehicle height control ECU.

A vehicle height control program that is shown in the flowchart of FIG. 7 is executed at set time intervals determined in advance. In step 1 (hereinafter, abbreviated as S1; the same applies to the other steps), a vehicle height of each of the four wheels is detected by a corresponding one of the vehicle height sensors 93. In S2, detected results of the getting on/off-related action detecting devices 95, and other devices, are read. In S3, it is determined whether the vehicle height control is being executed. When negative determination is made, it is determined in S4 whether the start condition is satisfied. When the start condition is not satisfied, S1, S2, S3, and S4 are repeatedly executed. When the start condition is satisfied during then, affirmative determination is made in S4. In S5, initial pattern selection is performed, and any one of the patterns A, B, C is selected. In S6, a start process is executed. The circuit valves 61, 62, 63, 64 are controlled in accordance with the selected pattern, and the vehicle height control valves 26 are controlled in correspondence with the wheels to be controlled.

Figure 8:
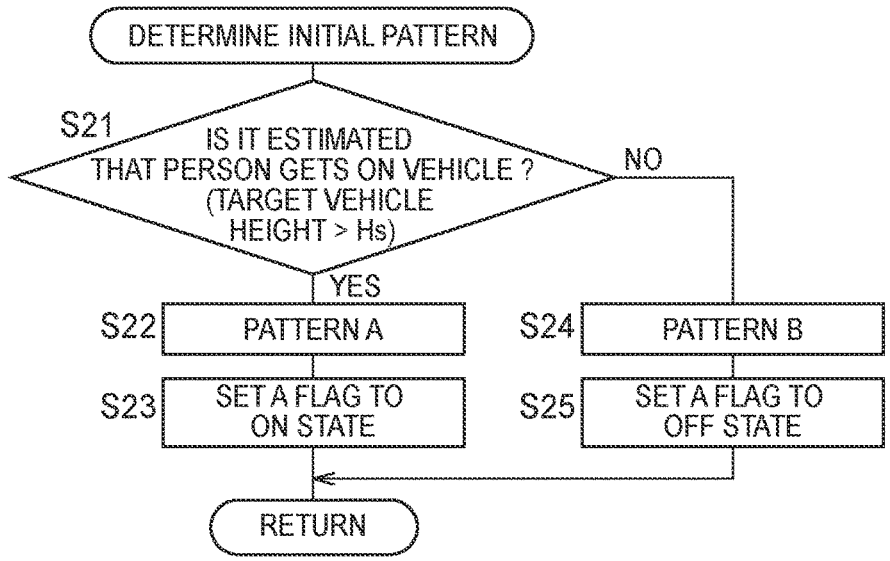
FIG. 8 is a flowchart that shows part of the vehicle height control program.

The initial pattern selection of S5 is performed in accordance with an initial pattern selection routine shown in the flowchart of FIG. 8. In S21, it is determined whether the start condition is satisfied on the condition that it is estimated that a person gets on the vehicle. When affirmative determination is made, the pattern A is selected in S22. In S23, an A flag is set to an on state. The A flag is a flag that indicates that the pattern A is selected at the beginning. In contrast, when negative determination is made in S21, the pattern B is selected in S24, and the A flag is set to an off state in S25.

As described above, in the first embodiment, the pattern A is selected only when it is estimated that a person gets on the vehicle, and the target vehicle height is set to a value higher than the set vehicle height Hs only when it is estimated that a person gets on the vehicle. For this reason, when the target vehicle height is higher than the set vehicle height Hs, it shows that the start condition that it is estimated that a person gets on the vehicle is satisfied. For this reason, it is presumable that the pattern A is selected based on the content of the start condition or selected based on the target vehicle height. It is also presumable that the pattern A is selected based on both the content of the start condition and the target vehicle height. This is because it is presumable that the pattern A is selected based on the fact that "a real vehicle height needs to be increased to a target vehicle height higher than the set vehicle height Hs in a period from when it is estimated that a person gets on the vehicle to when the person gets on the vehicle".

After the vehicle height control is started, affirmative determination is made in S3, and it is determined in S7 whether an end condition is satisfied. It is determined that the end condition is satisfied when a real vehicle height of each wheel to be controlled has reached the target vehicle height (for example, when a real vehicle height has reached a range that is determined based on the target vehicle height and a dead band width). When negative determination is made in S7, it is determined in S8 whether the A flag is in the on state. When negative determination is made, S9, S10, and S11 are not executed. When affirmative determination is made in S8, in-process pattern selection is performed in S9. In S10, it is determined whether the selected pattern and the current pattern are the same, that is, whether to change the pattern. When negative determination is made, S11 is not executed. When affirmative determination is made, the circuit valves 61, 62, 63, 64 are controlled in accordance with the selected pattern in S11.

Figure 9:
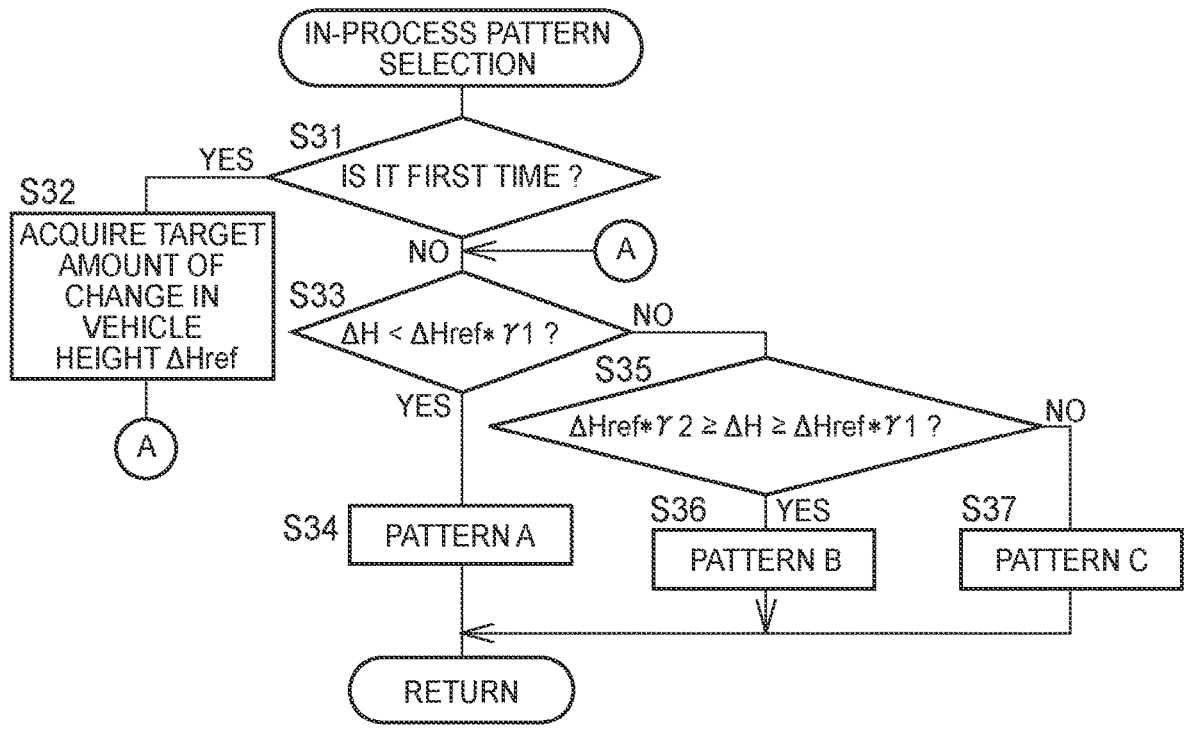
FIG. 9 is a flowchart that shows another part of the vehicle height control program.

The in-process pattern selection of S9 is performed in accordance with an in-process pattern selection routine shown in the flowchart of FIG. 9. In S31, it is determined whether the routine is executed for the first time. When the routine is executed for the first time, a target amount of change $\Delta Href$ that is a difference between the target vehicle height and the real vehicle height is obtained in S32. In S33, it is determined whether a real amount of change $\Delta H$ that is the amount of change in real vehicle height H is smaller than a first set amount of change (a value obtained by multiplying a target amount of change $\Delta Href$ by a ratio $\gamma 1$) ($\Delta H < \Delta Href \times \gamma 1$). When affirmative determination is made, the pattern A is selected in S34. When negative determination is made in S33, it is determined in S35 whether a real amount of change $\Delta H$ is larger than or equal to the first set amount of change and smaller than or equal to a second set amount of change (a value obtained by multiplying the target amount of change $\Delta Href$ by a ratio $\gamma 2$) ($\Delta Href \times \gamma 2 \geq \Delta H \geq \Delta Href \times \gamma 1$). When affirmative determination is made, the pattern R is selected in S36. When negative determination is made in S33, that is, when the real amount of change $\Delta H$ is larger than the second set amount of change ($\Delta H > \Delta Href \times \gamma 2$), the pattern C is selected in S37. The ratio $\gamma 1$ may be set to, for example, a value of about 70% to about 90%. The ratio $\gamma 2$ is a value larger than the ratio $\gamma 1$.

In the height increasing control, S1, S2, S3, S7, and S8, or S1, S2, S3, S7, S8, S9, and S10, (S11) are repeatedly executed until the end condition is satisfied. When the end condition is satisfied, an end process is executed in S12. All the currents that are supplied to the vehicle height control valves 26 and the circuit valves 61, 62, 63, 64 are stopped, and the vehicle height control valves 26 and the circuit valves 61, 62, 63, 64 are closed. In S13, the A flag is set to the off state.

Figure 10:
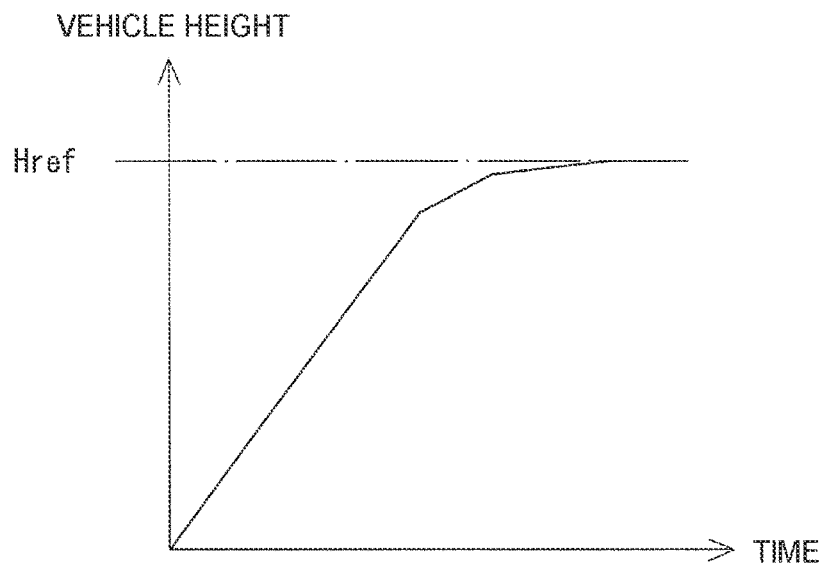
FIG. 10 is a graph that shows the relation between time and a change in vehicle height when the height increasing control has been executed.

As described above, in the first embodiment, the pattern is determined based on the content of the start condition, or the like, so it is possible to provide communication between the tank 34 and the common passage 22 in a state suitable for the height increasing control, in other words, a state that suits the request for the height increasing control. Thus, it is possible to supply air to the air cylinders 2 at a flow rate suitable for the height increasing control, in other words, a flow rate that suits the request for the height increasing control, so it is possible to execute the height increasing control at the rate of change in vehicle height that suits the request. In comparison with the case where a fixed pattern is constantly selected when the height increasing control is executed, it is possible to reduce the frequency of operation of each of the circuit valves 61, 62, 63, 64, so it is possible to extend the service life accordingly. During the height increasing control, as shown in FIG. 10, when the real vehicle height H has approached the target vehicle height (when the real amount of change has approached the target amount of change), the rate of change in vehicle height is reduced. For this reason, it is possible to shorten the time required of the height increasing control while avoiding an overshoot. It is also possible to reduce a feeling of strangeness of an occupant at the end of the height increasing control.

In the first embodiment, the tank passage 48, the first passage 50, and the like, constitute a "first passage". The tank passage 48, the second passage 52, and the like, constitute a "second passage". The tank passage 48 is shared between the first passage and the second passage. The tank passage 48, a portion between the connection point 48s at which the first passage 50 is connected to the tank passage 48 and the connection point 50s at which the first passage 50 is connected, the suction-side passage 65, the compressor 40, the discharge-side passage 66, a portion between the connection point 66s at which the second passage 52 is connected to the discharge-side passage 66 and the connection point 22s at which the second passage 52 is connected to the common passage 22, and the like, constitute a "third passage".

The circuit valves 61, 62 are electromagnetic valves provided in the first passage. The circuit valves 63, 64 are electromagnetic valves provided in the second passage. The circuit valves 61, 64 are electromagnetic valves provided in the third passage. These circuit valves 61, 62, 63, 64, and the like, constitute an electromagnetic valve device. Furthermore, in the first embodiment, the tank 34 is used as a high-pressure source.

A unit that stores the vehicle height control program in the ECU 80, a unit that executes the vehicle height control program in the ECU 80, the vehicle height sensors 93, and the like, constitute a vehicle height control unit. A unit that stores S5 in the ECU 80, a unit that executes S5 in the ECU 80, and the like, constitute an initial communication status selection unit. A unit that stores S9 in the ECU 80, a unit that executes S9 in the ECU 80, and the like, constitute an in-process communication status selection unit A unit that stores S5 and S6 in the ECU 80, a unit that executes S5 and S6 in the ECU 80, a unit that stores S9, S10, and S11 in the ECU 80, a unit that executes S9, S10, and S11 in the ECU 80, and the like, constitute a communication control unit. In the vehicle height control system, the state where the pattern A is set corresponds to a first communication state, the state where the pattern B is set corresponds to a second communication state, and the state where the pattern C is set corresponds to a third communication state. The first set amount of change corresponds to a set target amount of change.

Figure 11:
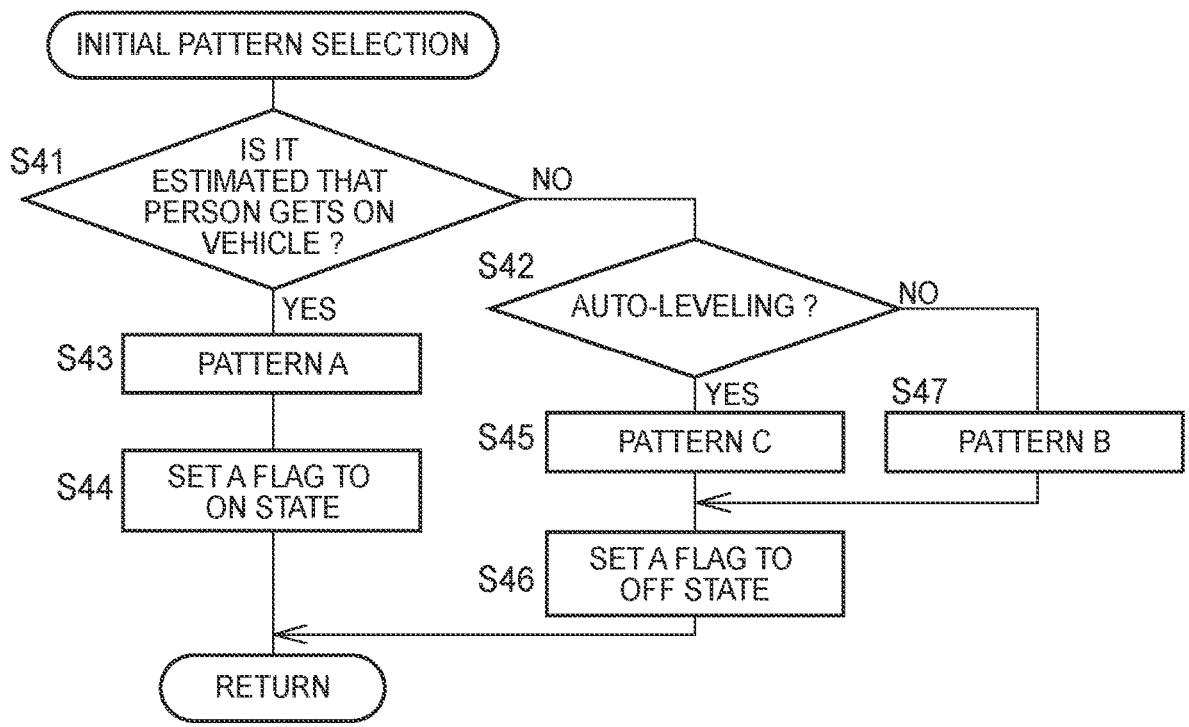
FIG. 11 is another flowchart that shows part of the vehicle height control program.

The initial pattern selection of S5 may be executed in accordance with an initial pattern selection routine shown in the flowchart of FIG. 11. In S41, it is determined whether the start condition is satisfied on the condition that it is estimated that a person gets on the vehicle. In S42, it is determined whether the start condition is satisfied on the condition that the condition to activate auto-leveling is satisfied. When affirmative determination is made in S41, the pattern A is selected in S43, and the A flag is set to the on state in S44. In contrast, when negative determination is made in S41 and affirmative determination is made in S42, the pattern C is selected in S45, and the A flag is set to the off state in S46. When negative determination is also made in S42, that is, when the start condition other than the fact that it is estimated that a person gets on the vehicle or the fact that auto-leveling is activated is satisfied, the pattern B is set in S47, and the A flag is set to the off state in S46. In this way, this alternative embodiment differs from the first embodiment in that the pattern C is set when auto-leveling is performed.

Figure 12:
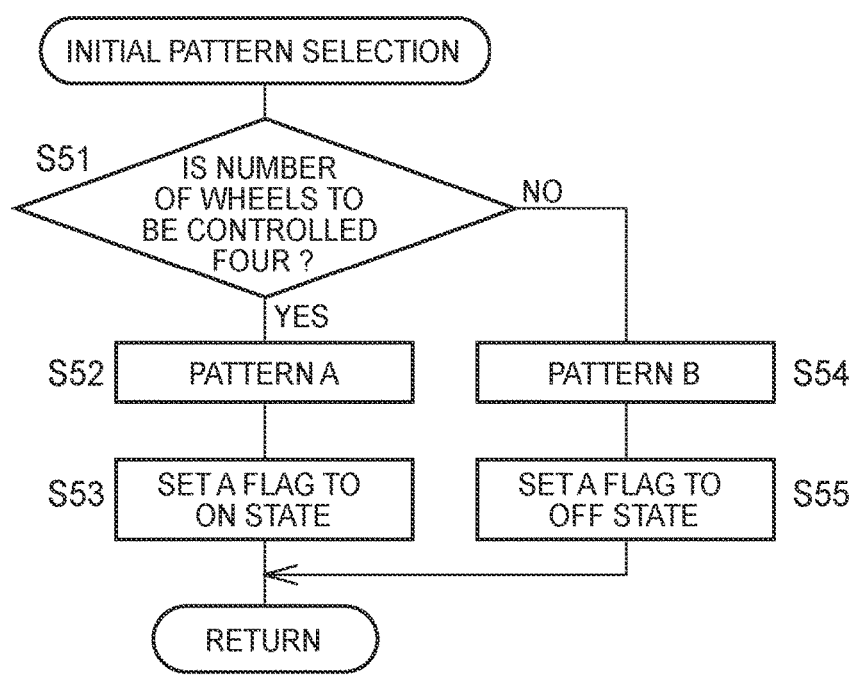
FIG. 12 is further another flowchart that shows part of the vehicle height control program.

The initial pattern selection of S5 may be executed in accordance with an initial pattern selection routine shown in the flowchart of FIG. 12. In another alternative embodiment, it is determined in S51 whether the wheels to be controlled are the four wheels. When the height increasing control is executed for the front and rear, right and left four wheels, the pattern A is set in S52, and the A flag is set to the on state in S53. When negative determination is made in S51, that is, when the number of wheels to be controlled is three or less, the pattern B is selected in S54, and the A flag is set to the off state in S55. In this way, the flow rate of air that is supplied to the common passage 22 is increased when the number of wheels to be controlled is large as compared to when the number of wheels to be controlled is small, in other words, when the number of the air cylinders 2 that are made to communicate with the tank 34 is large as compared to when the number of the air cylinders 2 that are made to communicate with the tank 34 is small. As a result, it is possible to favorably suppress a decrease in the rate of change in vehicle height in the case where the number of wheels to be controlled is large.

The initial pattern selection may be executed in accordance with any selected one of the initial pattern selection routine shown in the flowchart of FIG. 8, the initial pattern selection routine shown in the flowchart of FIG. 11 and the initial pattern selection routine shown in the flowchart of FIG. 12. The pattern may be selected based on a combination of both the number of wheels to be controlled and the content of the start condition.

In the first embodiment, the case where both the initial pattern selection and the in-process pattern selection are performed is described; however, the in-process pattern selection is not indispensable. When the in-process pattern selection is not performed, S8, S9, S10, S11 and S13 are unnecessary, and the A flag is unnecessary. In the first embodiment, one of the patterns A, B, C is selected; however, providing the pattern C is not indispensable. Any one of the patterns A, B may be selected. In this case, it may be regarded that the second set value corresponds to a target-based set vehicle height. The closed circuit is described. Instead, an open circuit may be employed. For example, in the circuit shown in FIG. 1, the compressor may be utilized as a high-pressure source instead of the tank 34.

Figure 13:
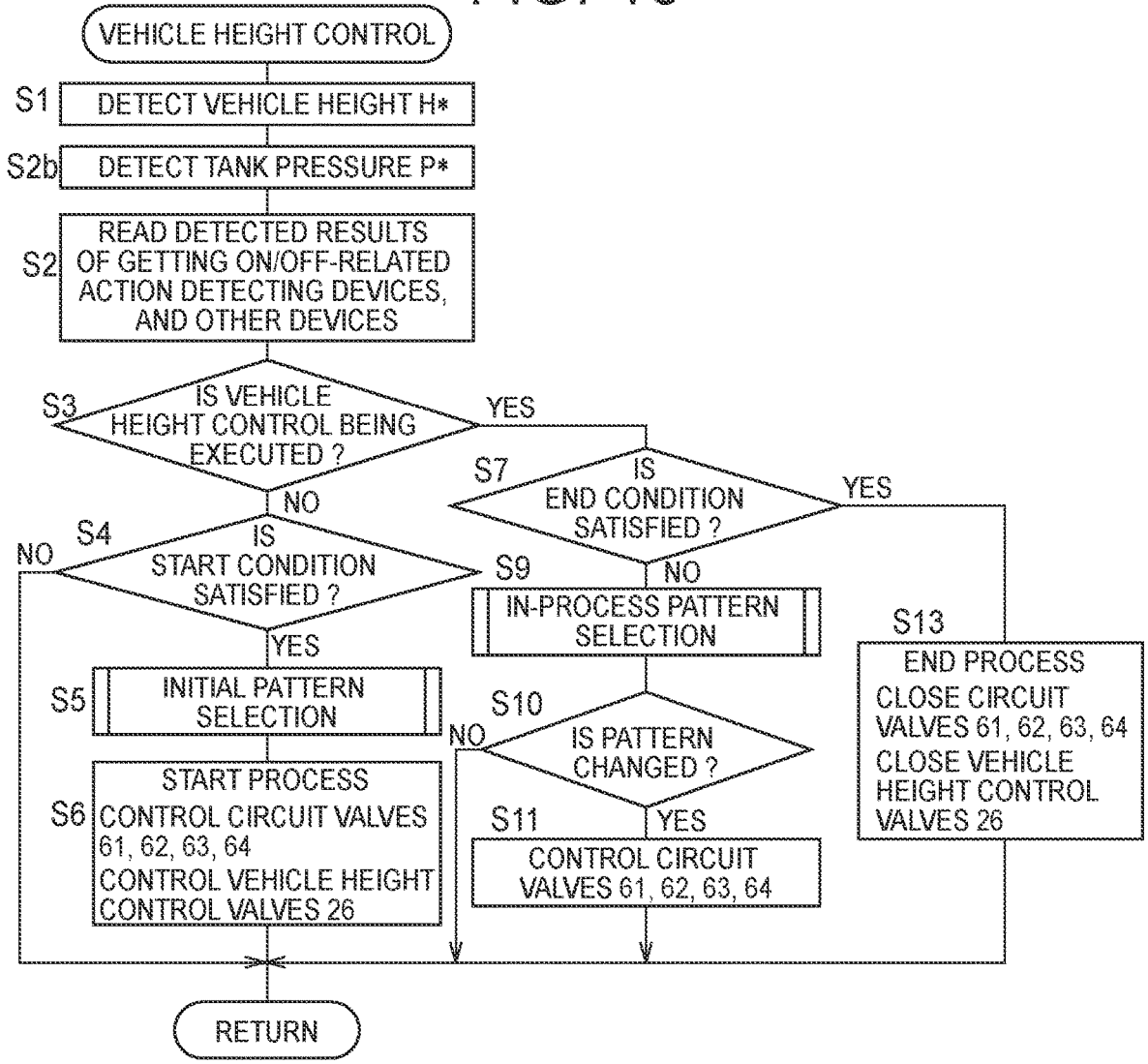
FIG. 13 is a flowchart that shows a vehicle height control program stored in a storage unit of a vehicle height control ECU of a vehicle height control system according to a second embodiment of the disclosure.

Next, a second embodiment of the disclosure will be described. In the second embodiment, the pattern is selected based on a tank pressure not only at the beginning but also during control. The height increasing control is executed in accordance with a vehicle height control program shown in the flowchart of FIG. 13. Initial pattern selection and in-process pattern selection are performed in accordance with a pattern selection routine shown in the flowchart of FIG. 14. In the second embodiment, since the A flag is unnecessary, S8 and S13 in the flowchart of FIG. 7 are not provided in the flowchart of FIG. 13. In addition, a tank pressure detection step S2b is provided before S2. The other steps are similar to those of the flowchart of FIG. 7, so the description of the other steps is omitted.

Figure 14:
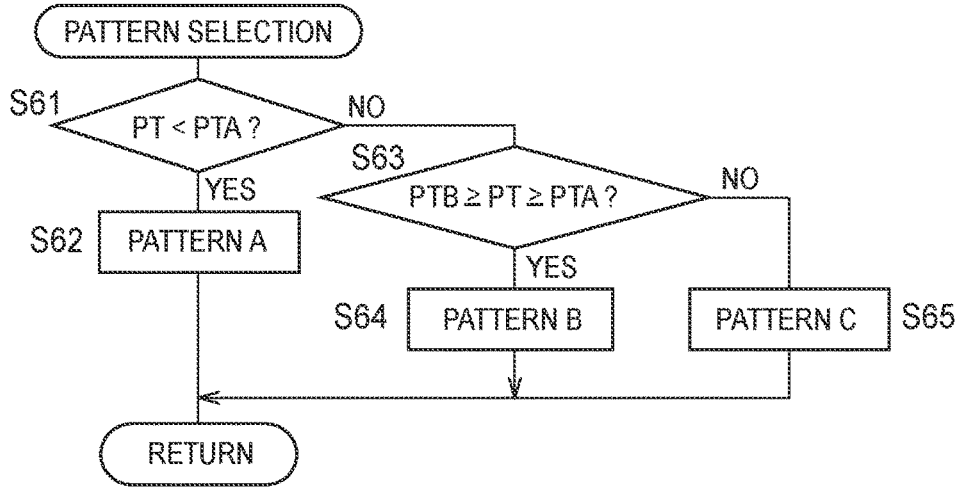
FIG. 14 is a flowchart that shows part of the vehicle height control program.

The initial pattern selection in S5 and the in-process pattern selection in S9 are performed in accordance with the pattern selection routine shown in the flowchart of FIG. 14. In S61, it is determined whether a tank pressure PT detected by the tank pressure sensor 90 in S2b is lower than a first set tank pressure PTA (PT<PTA). When the tank pressure PT is lower than the first set tank pressure, the pattern A is selected in S62. When negative determination is made in S61, it is determined in S63 whether the tank pressure. PT is higher than or equal to the first set tank pressure PTA and lower than or equal to a second set tank pressure PTB higher than the first set tank pressure PTA (PTB≥PT≥PTA). When affirmative determination is made, the pattern B is selected in S64. When negative determination is made in S63, that is, when the tank pressure PT is higher than the second set tank pressure PTB (PT>PTB), the pattern C is selected.

In this way, in the second embodiment, when the tank pressure is low, the flow rate of air that is supplied to the common passage 22 is increased as compared to when the tank pressure is high. As a result, it is possible to favorably suppress a decrease in the rate of change in vehicle height when the tank pressure is low, so it is possible to reduce a difference in the rate of change in vehicle height between when the tank pressure is high and when the tank pressure is low. In the second embodiment, a unit that stores S5 and S9 (the pattern selection routine shown in the flowchart of FIG. 14), a unit that executes S5 and S9, and the like, constitute a tank pressure-based selection unit. The first set tank pressure corresponds to a set tank pressure.

Other than the above-described embodiments, the disclosure may be implemented in modes including various changes or improvements based on the knowledge of persons skilled in the art.

In the following paragraphs, disclosures that can be claims for a patent will be described.

(1) A vehicle height control system includes a plurality of vehicle height control actuators, a fluid feeder, a vehicle height control unit and an initial communication status selection unit. The plurality of vehicle height actuators is provided in correspondence with a plurality of wheels of a vehicle. The fluid supply device includes a common passage and an electromagnetic valve device. Each of the vehicle height control actuators is connected to the common passage via a corresponding one of vehicle height control valves. The electromagnetic valve device includes (a) a high-pressure source, (b) a plurality of passages including a first passage and a second passage that connect the high-pressure source to the common passage in parallel with each other, and (c) at least one electromagnetic valve provided in each of the first passage and the second passage. The fluid feeder is configured to be able to supply fluid to the common passage. The vehicle height control unit includes a communication control unit. The communication control unit is configured to provide communication between the high-pressure source and the common passage by controlling the electromagnetic valve device based on one of a plurality of communication states including a first communication state and a second communication state. The first communication state is a state where the high-pressure source and the common passage are made to communicate with each other via the first passage and the second passage. The second communication state is a state where the first passage is shut off and the high-pressure source and the common passage are made to communicate with each other via the second passage. The vehicle height control unit is configured to execute height increasing control for increasing a vehicle height of at least one wheel to be controlled cut of the plurality of wheels by providing communication between the at least one vehicle height control actuator provided in the at least one wheel to be controlled and the common passage through control over the corresponding vehicle height control valve to supply fluid from the high-pressure source to the vehicle height control actuator of the at least one wheel to be controlled. The initial communication status selection unit is configured to, when a start condition for the height increasing control is satisfied, select one from among the plurality of communication states based on at least one of a content of the start condition, a target vehicle height of the height increasing control and the number of wheels to be controlled in the height increasing control. When the start condition is satisfied, the high-pressure source and the common passage are made to communicate with each other in one communication state selected by the initial communication status selection unit. The high-pressure source may include at least one of a tank and a compressor. The first passage and the second passage connect the high-pressure source to the common passage in parallel with each other. The first passage and the second passage may partially have a shared portion.

(2) In the vehicle height control system described in paragraph (1), the initial communication status selection unit is configured to select one from among the plurality of communication states based on the content of the start condition, the initial communication status selection unit is configured to select the first communication state when the start condition is satisfied, the start condition being a start condition that it is estimated that a person gets on the vehicle in a state where the vehicle is stopped, and the initial communication status selection unit is configured to select one from among at least one communication state obtained by excluding the first communication state from the plurality of communication states when the start condition is satisfied, the start condition being a start condition other than the start condition that it is estimated that a person gets on the vehicle in a state where the vehicle is stopped.

(3) In the vehicle height control system described in paragraph (2), the initial communication status selection unit is configured to select one from among at least one communication state obtained by excluding the first communication state from the plurality of communication states when (a) the start condition is satisfied, the start condition being a start condition that it is estimated that a person gets off the vehicle in a state where the vehicle is stopped, (b) the start condition is satisfied, the start condition being a start condition that a travel speed has changed from a state where the travel speed is higher than or equal to a first set speed to a state where the travel speed is lower than or equal to a second set speed lower than the first set speed in a state where the vehicle is traveling, or (c) the start condition is satisfied, the start condition being a start condition that a vehicle height of at least one wheel out of the plurality of wheels has reduced by a set value or more in a state where the vehicle is traveling.

(4) In the vehicle height control system described in any one of paragraph (1) through paragraph (3), the initial communication status selection unit is configured to select one from among the plurality of communication states based on the target vehicle height, the initial communication status selection unit is configured to, when the target vehicle height is higher than of equal to a set vehicle height, select the first communication state, and the initial communication status selection unit is configured to, when the target vehicle height is lower than the set vehicle height, select one from among at least one communication state obtained by excluding the first communication state from the plurality of communication states. The set vehicle height is a vehicle height higher than a normal vehicle height by a set value or more, and means a vehicle height at which it is considered to be desirable to select the first communication state when the vehicle height is increased to the set vehicle height. The target amount of change in vehicle height is often larger when the target vehicle height is high than when the target vehicle height is low. For this reason, the first communication state is selected when the target vehicle height is higher than or equal to the set vehicle height. Thus, it is possible to quickly bring a real vehicle height close to the target vehicle height. When the target vehicle height is determined in advance based on the content of a start condition, the content of the start condition can be found based on the target vehicle height. A target amount of change in vehicle height may be used instead of a target vehicle height.

(5) In the vehicle height control system described in any one of paragraph (1) through paragraph (4), the initial communication status selection unit is configured to select one from among the plurality of communication states based on the number of wheels to be controlled, the initial communication status selection unit is configured to, when the number of wheels to be controlled is four, select the first communication state, and the initial communication status selection unit is configured to, when the number of wheels to be controlled is three or less, select one from among at least one communication state obtained by excluding the first communication state from the plurality of communication states. When front and rear, right and left four wheels are the wheels to be controlled, the four vehicle height control valves are opened, and the four vehicle height control actuators are made to communicate with the common passage. When three or less wheels out of the front and rear, right and left four wheels are the wheels to be controlled, the three or less vehicle height control actuators are made to communicate with the common passage. The first communication state may be selected when three or more wheels are the wheels to be controlled, and one out of at least one communication state obtained by excluding the first communication state from the plurality of communication states may be selected when two or less wheels are the wheels to be controlled.

(6) In the vehicle height control system described in any one of paragraph (1) through paragraph (5), the high-pressure source includes a tank, the fluid feeder includes a tank pressure sensor configured to detect a tank pressure that is a pressure of fluid stored in the tank, and the communication control unit includes a tank pressure-based selection unit configured to select one from among the plurality of communication states based on the tank pressure detected by the tank pressure sensor. The tank pressure-based selection unit may be employed as the initial communication status selection unit or may be employed as an in-process communication status selection unit.

(7) In the vehicle height control system described in paragraph (6), the tank pressure-based selection unit is configured to, when the tank pressure is lower than a set tank pressure, select the first communication state, and the tank pressure-based selection unit is configured to, when the tank pressure is higher than or equal to the set tank pressure, select one from among at least one communication state obtained by excluding the first communication state from the plurality of communication states.

(8) In the vehicle height control system described in any one of paragraph (1) through paragraph (7), the communication control unit includes an in-process communication stains selection unit configured to select one from among the plurality of communication staves during the height increasing control.

(9) In the vehicle height control system described in paragraph (8), the in-process communication status selection unit is configured to, when an amount of change in real vehicle height that is the actual vehicle height during the height increasing control is smaller than a set target amount of change that is determined based on a target amount of change in vehicle height for the height increasing control, select the first communication state, and the in-process communication status selection unit is configured to, when the amount of change in real vehicle height is larger than or equal to the set target amount of change, select one from among at least one communication state obtained by excluding the first communication state from the plurality of communication states. The set target amount of change may be a value obtained by multiplying a target amount of change in vehicle height by a set ratio γ (0<γ<1). The set target amount of change may be set to a first set amount of change, a second set amount of change, a mid value between the first set amount of change and the second set amount of change, or the like, in the first embodiment.

(10) In the vehicle height control system described in any one of paragraph (1) through paragraph (9), the fluid feeder includes a third passage, the third passage is provided between the high-pressure source and the common passage in parallel with the first passage and the second passage, the third passage has a larger passage resistance than the first passage or the second passage, the plurality of communication suites includes a third communication state in addition to the first communication state and the second communication state, the third communication state is a state where the first passage and the second passage are shut off and the high-pressure source and the common passage are made to communicate with each other via the third passage, and the initial communication status selection unit is configured to, when the start condition is satisfied, select one from among the plurality of communication states based on at least one of a content, of the start condition, the target vehicle height and the number of wheels to be controlled. The third passage may be, for example, a passage having a smaller passage sectional area than the first passage or the second passage, a long passage, a passage in which a component having a throttle function is provided midway, or the like.

(11) In the vehicle height control system described in paragraph (10), the initial communication status selection unit is configured to select the third communication state when the start condition is satisfied, the start condition being a start condition that a vehicle height of at least one wheel out of the plurality of wheels has reduced by a set value or more in a state where the vehicle is traveling.

(12) In the vehicle height control system described in any one of paragraph (8) through paragraph (11), the fluid feeder includes a third passage, the third passage is provided between the high-pressure source and the common passage in parallel with the first passage and the second passage, the third passage has a larger passage resistance than the first passage or the second passage, the plurality of communication states includes a third communication state in addition to the first communication state and the second communication state, the third communication state is a communication state where the first passage and the second passage are shut off and the high-pressure source and the common passage are made to communicate with each other via the third passage, the in-process communication status selection unit is configured to, when an amount of change in real vehicle height that is the actual vehicle height during the height increasing control is smaller than a first set amount of change that is determined based on the target amount of change in vehicle height, select the first communication state, the in-process communication status selection unit is configured to, when the amount of change in real vehicle height is larger than or equal to the first set amount of change and smaller than or equal to a second set amount of change larger than the first set amount of change, select the second communication state, and the in-process communication status selection unit is configured to, when the amount of change in real vehicle height is larger than the second set amount of change, select the third communication state.

(13) A vehicle height control system includes a plurality of vehicle height control actuators, a fluid feeder, a vehicle height control unit and a tank pressure-based selection unit. The plurality of vehicle height actuators is provided in correspondence with a plurality of wheels of a vehicle. The fluid feeder includes a common passage and an electromagnetic valve device. Each of the vehicle height control actuators is connected to the common passage via a corresponding one of vehicle height control valves. The electromagnetic valve device includes (a) a tank, (b) a plurality of passages including a first passage and a second passage that connect the tank to the common passage in parallel with each other, and (c) at least one electromagnetic valve provided in each of the first passage and the second passage. The fluid feeder is configured to be able to supply fluid to the common passage. The vehicle height control unit includes a communication control unit. The communication control unit is configured to provide communication between the tank and the common passage by controlling the electromagnetic valve device based on one of a plurality of communication states including a first communication state and a second communication state. The first communication state is a state where the tank and the common passage are made to communicate with each other via the first passage and the second passage. The second communication state is a state where the first passage is shut off and the tank and the common passage are made to communicate with each other via the second passage. The vehicle height control unit is configured to execute height increasing control for increasing a vehicle height of at least one wheel to be controlled out of the plurality of wheels by providing communication between the at least one vehicle height control actuator provided in the at least one wheel to be controlled and the common passage through control over the corresponding vehicle height control valve to supply fluid from the tank to the vehicle height control actuator of the at least one wheel to be controlled. The initial communication status selection unit is configured to, when a start condition for the height increasing control is satisfied, select one from among the plurality of communication states based on at least one of a content of the start condition, a target vehicle height of the height increasing control and the number of wheels to be controlled in the height increasing control. A technical feature described in any one of paragraph (1) through paragraph (12) may be employed in the vehicle height control system described in this paragraph.

What is claimed is:

1. A vehicle height control system comprising:
a plurality of vehicle height control actuators provided in correspondence with a plurality of wheels of a vehicle;
a fluid feeder including a common passage to which each of the vehicle height control actuators is connected via a corresponding one of vehicle height control valves, and an electromagnetic valve device, the electromagnetic valve device including a high-pressure source, a plurality of passages including a first passage and a second passage that connect the high-pressure source to the common passage in parallel with each other, and at least one electromagnetic valve provided in each of the first passage and the second passage, the fluid feeder being configured to be able to supply fluid to the common passage; and a vehicle height control unit including a communication control unit, the communication control unit being configured to provide communication between the high-pressure source and the common passage by controlling the electromagnetic valve device based on one of a plurality of communication states including a first communication state and a second communication state, the first communication state being a state where the high-pressure source and the common passage are made to communicate with each other via the first passage and the second passage, the second communication state being a state where the first passage is shut off and the high-pressure source and the common passage are made to communicate with each other via the second passage, the vehicle height control unit being configured to execute height increasing control for increasing a vehicle height of at least one wheel to be controlled out of the plurality of wheels by making at least one of the plurality of vehicle height control actuators provided in the at least one wheel to be controlled communicate with the common passage through control over the corresponding vehicle height control valve to supply fluid from the high-pressure source to the vehicle height control actuator of the at least one wheel to be controlled, wherein the communication control unit is configured to select one from among the plurality of communication states based on at least one of a content of a start condition, a target vehicle height of the height increasing control and the number of wheels to be controlled in the height increasing control, when the start condition of the height increasing control is satisfied, wherein the communication control unit is configured to:
select one from among the plurality of communication states based on the content of the start condition;
select the first communication state when the start condition is satisfied, the start condition being a start condition that it is estimated that a person gets on the vehicle in a state where the vehicle is stopped; and
select one from among at least one communication state obtained by excluding the first communication state from the plurality of communication states when the start condition is satisfied, the start condition being a start condition other than the start condition that it is estimated that a person gets on the vehicle in a state where the vehicle is stopped, wherein the communication control unit is configured to select one from among the at least one communication state obtained by excluding the first communication state from the plurality of communication states when the start condition is satisfied, the start condition being a start condition that it is estimated that a person gets off the vehicle in a state where the vehicle is stopped.

2. The vehicle height control system according to claim 1, wherein the communication control unit is configured to:
select one from among the plurality of communication states based on the target vehicle height;
select the first communication state, when the target vehicle height is higher than or equal to a set vehicle height; and select one from among at least one communication state obtained by excluding the first communication stats from the plurality of communication states, when the target vehicle height is lower than the set vehicle height.

3. The vehicle height control system according to claim 1, wherein the communication control unit is configured to:
select one from among the plurality of communication states based on the number of wheels to be controlled;
select the first communication state, when the number of wheels to be controlled is four; and select one from among at least one communication state obtained by excluding the first communication state from the plurality of communication states, when the number of wheels to be controlled is three or less.

4. The vehicle height control system according to claim 1, wherein:
the high-pressure source includes a tank;
the fluid feeder includes a tank pressure sensor configured to detect a tank pressure that is a pressure of fluid stored in the tank; and
the communication control unit is configured to select one from among the plurality of communication states based on the tank pressure detected by the tank pressure sensor, select the first communication state, when the tank pressure is lower than a set tank pressure, and select one from among at least one communication state obtained by excluding the first communication state from the plurality of communication states, when the tank pressure is higher than or equal to the set tank pressure.

5. The vehicle height control system according to claim 1, wherein the communication control unit is configured to:
select one from among the plurality of communication states during the height increasing control;
select the first communication state, when an amount of change in real vehicle height that is an actual vehicle height during the height increasing control is smaller than a set target amount of change that is determined based on a target amount of change in vehicle height for the height increasing control; and
select one from among at least one communication state obtained by excluding the first communication state from the plurality of communication states, when the amount of change in real vehicle height is larger than or equal to the set target amount of change.

6. The vehicle height control system according to claim 1, wherein:
the fluid feeder includes a third passage, the third passage is provided between the high-pressure source and the common passage in parallel with the first passage and the second passage, the third passage has a larger passage resistance than the first passage and the second passage; and
the plurality of communication states includes a third communication state in addition to the first communication state and the second communication state, the third communication state is a communication state where the first passage and the second passage are shut off and the high-pressure source and the common passage are made to communicate with each other via the third passage.

7. The vehicle height control system according to claim 6, wherein the communication control unit is configured to select the third communication state when the start condition is satisfied.

8. The vehicle height control system according to claim 6, wherein:

the fluid feeder includes a third passage, the third passage is provided between the high-pressure source and the common passage in parallel with the first passage and the second passage, the third passage has a larger passage resistance than the first passage or the second passage;

the plurality of communication states includes a third communication state in addition to the first communication state and the second communication state, the third communication state is a communication state where the first passage and the second passage are shut off and the high- pressure source and the common passage are made to communicate with each other via the third passage; and the communication control unit is configured to, during control, select the first communication state, when an amount of change in real vehicle height that is an actual vehicle height during the height increasing control is smaller than a first set amount of change that is determined based on the target amount of change in vehicle height, select the second communication state, when the amount of change in real vehicle height is larger than or equal to the first set amount of change and smaller than or equal to a second set amount of change larger than the first set amount of change, and select the third communication state, when the amount of change in real vehicle height is larger than the second set amount of change.

9. A vehicle height control system comprising:

a plurality of vehicle height control actuators provided in correspondence with a plurality of wheels of a vehicle;

a fluid feeder including a common passage to which each of the vehicle height control actuators is connected via a corresponding one of vehicle height control valves, and an electromagnetic valve device, the electromagnetic valve device including a high-pressure source, a plurality of passages including a first passage and a second passage that connect the high-pressure source to the common passage in parallel with each other, and at least one electromagnetic valve provided in each of the first passage and the second passage, the fluid feeder being configured to be able to supply fluid to the common passage; and a vehicle height control unit including a communication control unit, the communication control unit being configured to provide communication between the high-pressure source and the common passage by controlling the electromagnetic valve device based on one of a plurality of communication states including a first communication state and a second communication state, the first communication state being a state where the high-pressure source and the common passage are made to communicate with each other via the first passage and the second passage, the second communication state being a state where the first passage is shut off and the high-pressure source and the common passage are made to communicate with each other via the second passage, the vehicle height control unit being configured to execute height increasing control for increasing a vehicle height of at least one wheel to be controlled out of the plurality of wheels by making at least one of the plurality of vehicle height control actuators provided in the at least one wheel to be controlled communicate with the common passage through control over the corresponding vehicle height control valve to supply fluid from the high-pressure source to the vehicle height control actuator of the at least one wheel to be controlled, wherein the communication control unit is configured to select one from among the plurality of communication states based on at least one of a content of a start condition, a target vehicle height of the height increasing control and the number of wheels to be controlled in the height increasing control, when the start condition of the height increasing control is satisfied, wherein the high-pressure source includes a tank, wherein the fluid feeder includes a tank pressure sensor configured to detect a tank pressure that is a pressure of fluid stored in the tank, wherein the communication control unit is configured to select one from among the plurality of communication states based on the tank pressure detected by the tank pressure sensor, select the first communication state, when the tank pressure is lower than a set tank pressure, and select one from among at least one communication state obtained by excluding the first communication state from the plurality of communication states, when the tank pressure is higher than or equal to the set tank pressure.

10. A vehicle height control system comprising:

a plurality of vehicle height control actuators provided in correspondence with a plurality of wheels of a vehicle;

a fluid feeder including a common passage to which each of the vehicle height control actuators is connected via a corresponding one of vehicle height control valves, and an electromagnetic valve device, the electromagnetic valve device including a high-pressure source, a plurality of passages including a first passage and a second passage that connect the high-pressure source to the common passage in parallel with each other, and at least one electromagnetic valve provided in each of the first passage and the second passage, the fluid feeder being configured to be able to supply fluid to the common passage; and a vehicle height control unit including a communication control unit, the communication control unit being configured to provide communication between the high-pressure source and the common passage by controlling the electromagnetic valve device based on one of a plurality of communication states including a first communication state and a second communication state, the first communication state being a state where the high-pressure source and the common passage are made to communicate with each other via the first passage and the second passage, the second communication state being a state where the first passage is shut off and the high-pressure source and the common passage are made to communicate with each other via the second passage, the vehicle height control unit being configured to execute height increasing control for increasing a vehicle height of at least one wheel to be controlled out of the plurality of wheels by making at least one of the plurality of vehicle height control actuators provided in the at least one wheel to be controlled communicate with the common passage through control over the corresponding vehicle height control valve to supply fluid from the high-pressure source to the vehicle height control actuator of the at least one wheel to be controlled, wherein the communication control unit is configured to select one from among the plurality of communication states based on at least one of a content of a start condition, a target vehicle height of the height increasing control and the number of wheels to be controlled in the height increasing control, when the start condition of the height increasing control is satisfied, wherein the communication control unit is configured to:

select one from among the plurality of communication states during the height increasing control;

select the first communication state, when an amount of change in real vehicle height that is an actual vehicle height during the height increasing control is smaller than a set target amount of change that is determined based on a target amount of change in vehicle height for the height increasing control; and select one from among at least one communication state obtained by excluding the first communication state from the plurality of communication states, when the amount of change in real vehicle height is larger than or equal to the set target amount of change.

\* \* \* \* \*

UNITED STATES PATENT AND TRADEMARK OFFICE
CERTIFICATE OF CORRECTION

PATENT NO. : 10,744,840 B2
APPLICATION NO. : 16/103437
DATED : August 18, 2020
INVENTOR(S) : Shogo Tanaka et al.

It is certified that error appears in the above-identified patent and that said Letters Patent is hereby corrected as shown below:

On the Title Page

Item (72), inventor 1, city, delete "Toyota" and insert --Toyota-shi Aichi-ken--, therefor.

Item (72), inventor 2, city, delete "Chiryu" and insert --Chiryu-shi Aichi-ken--, therefor.

Item (72), inventor 3, city, delete "Toyota" and insert --Toyota-shi Aichi-ken--, therefor.

Item (72), inventor 4, city, delete "Nissin" and insert --Nissin-shi Aichi-ken--, therefor.

Item (72), inventor 5, city, delete "Okazaki" and insert --Okazaki-shi Aichi-ken--, therefor.

Item (72), inventor 6, city, delete "Anjo" and insert --Anjo-shi Aichi-ken--, therefor.

Item (72), inventor 7, city, delete "Kariya" and insert --Kariya-shi Aichi-ken--, therefor.

In the Specification

Column 1, Line 29, delete "hue" and insert --line--, therefor.

Column 1, Line 33, delete "How" and insert --flow--, therefor.

Column 2, Line 49, delete "How" and insert --flow--, therefor.

Column 4, Line 9, delete "fee" and insert --be--, therefor.

Column 4, Line 62, delete "Or" and insert --or--, therefor.

Column 6, Line 44, delete "ort" and insert --on--, therefor.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,744,840 B2

Column 6, Line 60, delete "fin id" and insert --fluid--, therefor.

Column 7, Line 22 & 23, delete "is connected is connected" and insert --is connected--, therefor.

Column 7, Line 62, delete "sir" and insert --air--, therefor.

Column 8, Line 13, delete "How" and insert --flow--, therefor.

Column 8, Line 19, delete "How" and insert --flow--, therefor.

Column 8, Line 37, delete "801" and insert --80i--, therefor.

Column 10, Line 33, delete "fee" and insert --be--, therefor.

Column 11, Line 15, delete "con tic tied" and insert --controlled--, therefor.

Column 18, Line 65, delete "stains" and insert --status--, therefor.

Column 18, Line 66, delete "staves" and insert --states--, therefor.